United States Patent
Salemme et al.

(10) Patent No.: US 7,810,316 B2
(45) Date of Patent: Oct. 12, 2010

(54) APPARATUS, SYSTEM, AND METHOD FOR EXHAUST AFTERTREATMENT EFFICIENCY ENHANCEMENT

(75) Inventors: Gary Salemme, Columbus, IN (US); Hasan Mohammed, Bloomington, IN (US)

(73) Assignee: Cummins Filtration IP, Inc, Minneapolis, MN (US)

( * ) Notice: Subject to any disclaimer, the term of this patent is extended or adjusted under 35 U.S.C. 154(b) by 951 days.

(21) Appl. No.: 11/618,158

(22) Filed: Dec. 29, 2006

(65) Prior Publication Data
US 2008/0155968 A1 Jul. 3, 2008

(51) Int. Cl.
*F01N 3/00* (2006.01)

(52) U.S. Cl. .............................. 60/288; 60/273; 60/285; 60/287; 60/299

(58) Field of Classification Search ........... 60/284–289, 60/295, 299
See application file for complete search history.

(56) References Cited

U.S. PATENT DOCUMENTS

| | | | |
|---|---|---|---|
| 6,484,495 B2 * | 11/2002 | Minami ....................... | 60/288 |
| 6,615,580 B1 | 9/2003 | Khair et al. | |
| 6,732,507 B1 | 5/2004 | Stanglmaier et al. | |
| 6,823,663 B2 | 11/2004 | Hammerle et al. | |
| 6,862,879 B2 | 3/2005 | Upadhyay et al. | |
| 6,915,629 B2 | 7/2005 | Szymkowicz | |
| 2004/0187483 A1 * | 9/2004 | Dalla Betta et al. ........... | 60/286 |
| 2006/0010859 A1 * | 1/2006 | Yan et al. ....................... | 60/286 |

OTHER PUBLICATIONS

PCT International Search and Written Opinion, May 16, 2008.
PCT/US2007/089220, PCT International Preliminary Report on Patentability, Sep. 4, 2009.

* cited by examiner

*Primary Examiner*—Thomas E Denion
*Assistant Examiner*—Jesse Bogue
(74) *Attorney, Agent, or Firm*—Kunzler Needham Massey & Thorpe

(57) ABSTRACT

An apparatus, system, and method are disclosed for enhancing the efficiency of an exhaust aftertreatment application. The method may include determining the current operating conditions of the application, the optimal operating conditions of a target component, and the performance criteria of a conditioning component relative to the optimal operating conditions. The method may include determining an optimal fraction of an exhaust flow to pass through the conditioning component to achieve the optimal operating conditions of the target component. The method may further include manipulating a bypass valve position based on the optimal fraction of exhaust flow to pass through the conditioning component. The target component may be a selective catalyst reduction (SCR) component that operates optimally at a designed $NO_2/NO_x$ mole ratio. The conditioning component may be a diesel oxidation catalyst (DOC) that affects the $NO_2/NO_x$ mole ratio. A method is thereby provided to operate an exhaust aftertreatment application more efficiently relative to an application without the invention.

21 Claims, 17 Drawing Sheets

APPARATUS, SYSTEM, AND METHOD FOR EXHAUST AFTERTREATMENT EFFICIENCY ENHANCEMENT

BACKGROUND OF THE INVENTION

1. Field of the Invention

This invention relates to the efficient operation of engine aftertreatment systems, and more particularly relates to aftertreatment systems comprising a diesel particulate filter or a selective catalytic reduction system.

2. Description of the Related Art

Diesel emissions regulations are driving many modern diesel engine systems to utilize aftertreatment devices to clean up exhaust emissions downstream of the engine. These devices typically have the property that they cannot be reconfigured in real time, and therefore must be designed such that the engine system can meet emissions regulations at all operating points. In practical terms, this typically means that the aftertreatment devices are configured to treat the full engine exhaust at rated operation, or maximum load on the engine system.

While this method makes an emissions compliant engine, it produces an over-designed system that operates at a low efficiency in many operating conditions for many applications. Some examples are in selective catalytic reduction (SCR) systems, and diesel particulate filters (DPFs).

SCR systems are utilized to reduce $NO_x$ in the exhaust gas to nitrogen. The SCR system operates optimally when the engine out $NO_x$ comprises equal parts NO and $NO_2$. The $NO_x$ coming out of a diesel engine is typically mostly NO, and a component configured active to $NO_x$, specifically to convert NO to $NO_2$, is often installed upstream of the SCR component. This upstream component may be a diesel oxidation catalyst (DOC). The DOC typically contains a platinum-based catalyst, and is usually designed to convert enough NO to $NO_2$ that the SCR system can convert enough $NO_x$ at rated engine operation to meet emissions regulations. The result of this is that at many operating conditions, the DOC converts too much NO to $NO_2$, resulting in excessive use of the SCR reagent (usually urea or ammonia) as the SCR system operates at non-optimal efficiency with the excess $NO_2$.

Another inefficiency in SCR systems is that an SCR catalyst may require a certain temperature to convert sufficient NOx for the engine system to meet emissions constraints. However, in a cold start environment, there may be several components upstream of the SCR catalyst that must be heated up before the exhaust stream will reach the SCR catalyst at a temperature sufficient to heat the SCR catalyst up. While those emissions components may be important for meeting overall emissions, the engine system may be designed such that they only need to be utilized intermittently to achieve the emissions targets. In one example, a DPF may be upstream of the SCR catalyst. The DPF may be 95% efficient at trapping particulates, but the engine system may only need 80% trapping to meet the emissions targets.

Some DPF systems utilize a DOC to convert NO to $NO_2$, and enhance oxidation of soot in the DPF during normal operation between oxygen-based regeneration events. In these systems, the DOC may be sized for a high flow rate of exhaust flow, and there may be excessive NO to $NO_2$ conversion during lower flow rates. Excessive $NO_2$ can exceed design limitations—for example a limitation on the amount of $NO_2$ out of the tailpipe to control brown smoke. Further, as a DPF becomes loaded with soot, it may begin exerting excessive backpressure on the engine.

From the foregoing discussion, it should be apparent that a need exists for an apparatus, system, and method that provides for enhancing efficiency in an exhaust aftertreatment system. Beneficially, such an apparatus, system, and method would manage an exhaust stream to help an SCR system perform optimally, to assist a DPF in performing optimally, and/or minimize the time and fuel consumed in getting an SCR system up to operating temperatures.

SUMMARY OF THE INVENTION

The present invention has been developed in response to the present state of the art, and in particular, in response to the problems and needs in the art that have not yet been fully solved by currently available particulate filter systems. Accordingly, the present invention has been developed to provide an apparatus, system, and method for enhancing the efficiency of an aftertreatment system that overcome many or all of the above-discussed shortcomings in the art.

An apparatus is provided to enhance the efficiency of an aftertreatment system. The apparatus may have an intake module configured to receive a fluid stream. The apparatus may further include a bypass valve configured to direct a first fraction of the fluid stream to a first flowpath, and a second fraction of the fluid stream to a second flowpath. One or both flowpaths may comprise at least one conditioning component configured to change some characteristic of the fluid stream relevant to a downstream target component. The apparatus may further include a controller provided with a plurality of modules configured to functionally execute some aspects of the invention.

The controller may comprise a sensing module, a target selection module, a conditioning performance module, a fraction determination module, and a valve position module. The controller may further comprise an emissions module.

The sensing module may be configured to interpret a plurality of operating conditions which may include temperatures, flow rates, and other parameters of the conditioning component(s), the target component(s), and the fluid stream. The target selection module may be configured to interpret the operating criteria of the target component(s). The operating criteria of the target component(s) may indicate the optimal and/or preferred operating parameters for the target component.

The conditioning performance module may be configured to interpret the performance criteria for the conditioning component(s). The performance criteria may indicate the performance of the conditioning component(s) relative to the operating criteria of the target component(s). The fraction determination module may utilize the interpreted operating criteria, the interpreted performance criteria, and the interpreted operating conditions to determine an optimal value for the first fraction, or that portion of the fluid stream that the bypass valve will direct to the first flowpath.

The emissions module may interpret an emissions scheme to determine a minimum first fraction value that will meet the current emissions considerations for the current operating point of the system. The fraction determination module may be further configured to combine the minimum first fraction value with the optimal first fraction value to determine a first fraction target. The valve position module may be configured to manipulate the bypass valve based on the first fraction target.

The target component may comprise a selective catalytic reduction (SCR) component which operates well at an optimal $NO_2/NO_x$ mole ratio, and at a minimum temperature. The target component may comprise a diesel particulate filter (DPF) configured to collect soot, and that may operate well at certain $NO_2$ flow rates through the filter.

The first flowpath may comprise a diesel oxidation catalyst (DOC) as a conditioning component. The first flowpath may further include a DPF as a conditioning component. The second flowpath may comprise a fluid conduit configured to bypass flow around the conditioning component(s) of the first flowpath. The second flowpath may further comprise one or more conditioning components.

A method is presented including the operations to enhance the efficiency of an exhaust aftertreatment system. The method may be operated on a computer programming product. The method may include interpreting a plurality of operating conditions, interpreting operating criteria for each target component, and interpreting performance criteria for each conditioning component. The method may further include interpreting an emissions compliance scheme to determine a minimum first fraction value. The method may include determining a first fraction target based on the minimum first fraction value, the operating criteria, the performance criteria, and the operating conditions. The method may include manipulating a bypass valve position based on the first fraction target.

In one embodiment, a method is presented for modifying an exhaust aftertreatment system to enhance the efficiency of the exhaust aftertreatment system. The method may include installing a bypass valve and a second flowpath on an exhaust aftertreatment system. The method may further include installing a controller on the existing exhaust aftertreatment system. The controller may comprise a sensing module, a target selection module, a conditioning performance module, a fraction determination module, and a valve position module. The controller may further comprise an emissions module.

A system for enhancing the efficiency of an exhaust aftertreatment application is presented. The system may include an internal combustion engine providing an exhaust stream. The system may further include a bypass valve configured to direct a first fraction of the fluid stream to a first flowpath, and a second fraction of the fluid stream to a second flowpath. The first flowpath may comprise a DOC, and the second flowpath may comprise a fluid conduit. The system may further include a mixing component to mix the flow from the first and second flowpaths. The system may include a reagent injector, which may be configured to inject a reducing agent into the exhaust stream. The system may further include a target component which may be an SCR component.

The system may further include a controller provided with a plurality of modules configured to functionally execute some aspects of the invention. The controller may comprise a sensing module, a target selection module, a conditioning performance module, a fraction determination module, and a valve position module. The controller may further comprise an emissions module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in FIGS. 1 through 17, is not intended to limit the scope of the invention, as claimed, but is merely representative of selected embodiments of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
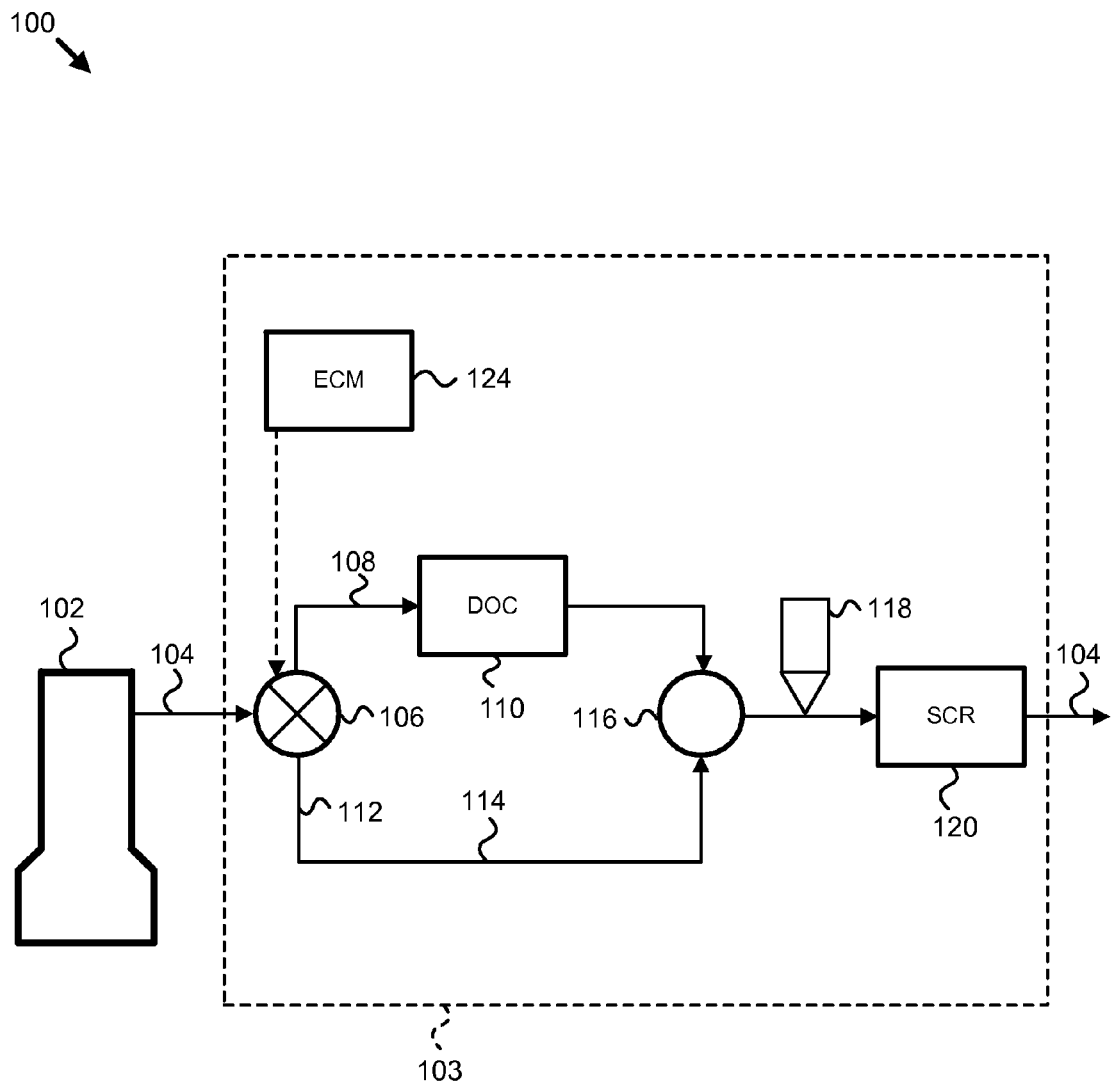
FIG. 1 is a schematic block diagram depicting one embodiment of a system for enhancing exhaust aftertreatment efficiency in accordance with the present invention.

FIG. 1 is a schematic block diagram depicting one embodiment of a system 100 for enhancing exhaust aftertreatment efficiency in accordance with the present invention. The system 100 may include an internal combustion engine 102 producing an exhaust stream 104. The exhaust stream 104 may be a fluid stream of combustion byproducts containing particulate matter and nitrogen oxides ($NO_x$). The system 100 may further include an aftertreatment system 103 configured to reduce one or more emissions of the exhaust stream 104.

The aftertreatment system 103 may comprise a bypass valve 106 configured to direct a first fraction 108 of the exhaust stream 104 to a conditioning component 110, which may be a diesel oxidation catalyst (DOC). The bypass valve 106 may be further configured to direct a second fraction of the exhaust stream to a fluid conduit 114. The sum of the first fraction 108 and the second fraction 112 may equal 100 percent of the exhaust stream 104. For example, if the first fraction 108 is 40% of the exhaust stream 104, the second fraction 112 may be 60% of the exhaust stream 104.

The aftertreatment system 103 may further include a mixing component 116 configured to combine the flow from the DOC 110 and the fluid conduit 114. In the embodiment of FIG. 1, the bypass valve 106 is thereby configured to direct none, some, or all of the exhaust stream 104 to the DOC 110, and to bypass the DOC 110 with the remainder of the flow.

The aftertreatment system 103 may further include a reagent injector 118 configured to add a reducing reagent to the flow from the mixing component 116. Without limitation, the reducing reagent may be a chemical such as ammonia or urea. The aftertreatment system 103 may further include a target component 120 which may be a selective catalytic reduction (SCR) component. The SCR component 120 may be configured to reduce $NO_x$ to $N_2$ within the flow from the mixing component 116.

The aftertreatment system 103 may further include a controller 124 which may comprise an electronic control module (ECM). The controller 124 may be configured to interpret various operating conditions within the system 100, and to control the bypass valve 106. Without limitation, the controller 124 may interpret operating conditions by communication over a datalink with other controllers (not shown), and/or by communication with one or more sensors within the system 100. The controller 124 may control the bypass valve 106 by electronic commands over a datalink, electronic control of the valve, pneumatic control of the valve, or by other methods known in the art.

Figure 2:
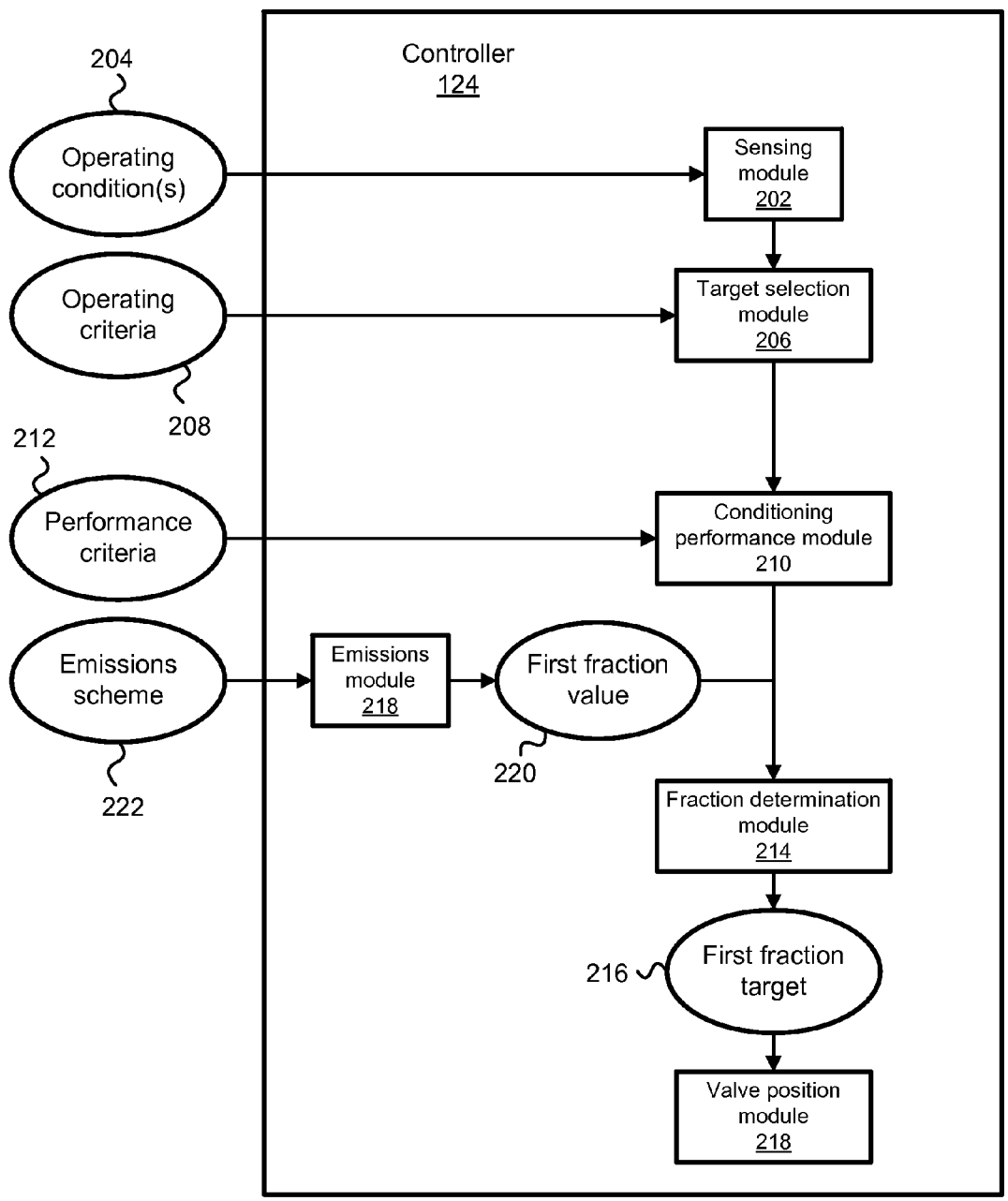
FIG. 2 is a schematic block diagram depicting one embodiment of a controller in accordance with the present invention.

FIG. 2 is a schematic block diagram depicting one embodiment of a controller 124 in accordance with the present invention. The controller 124 may comprise a sensing module 202 configured to interpret a plurality of operating conditions 204. Without limitation, the sensing module 202 may interpret the plurality of operating conditions 204 through electronic communication with sensors, through communication over a datalink to other electronic control modules, and/or through virtual sensors which may comprise calculated values of certain operating conditions based on other measured parameters. The plurality of operating conditions 204 may comprise one or more of an exhaust stream 104 flow rate, a $NO_x$ fraction in the exhaust stream 104, an $NO_2/NO_x$ mole ratio in the exhaust stream 104, a temperature in the DOC 110, and various other temperatures, pressures, compositions, flow rates, and other operating parameters within the system 100.

The controller 124 may further comprise a target selection module 206 configured to interpret operating criteria 208 for the SCR component 120. The operating criteria 208 may comprise a $NO_x$ to $N_2$ conversion based on an $NO_2/NO_x$ mole ratio into the SCR component 120 from the mixing component 116. The operating criteria 208 may comprise $NO_x$ to $N_2$ conversion values at a given exhaust stream 104 flow rate and $NO_x$ fraction in the exhaust stream 104. The operating criteria 208 may further comprise several sets of $NO_x$ to $N_2$ conversions based on an $NO_2/NO_x$ mole ratio for several different exhaust stream 104 flow rates and $NO_x$ fractions in the exhaust stream 104. Without limitation, interpreting the operating criteria 208 may comprise reading the criteria from a datalink, reading the criteria from a data memory location, measuring the criteria electronically, or calculating the criteria from other parameters according to a defined function or algorithm.

The controller 124 may further comprise a conditioning performance module 210 configured to interpret performance criteria 212 for the conditioning component 110. In one embodiment, the performance criteria 212 may comprise an $NO_2/NO_x$ mole ratio out of the DOC 110 based on a flow rate 108 through the DOC 110. In one embodiment, the performance criteria 208 may comprise several sets of $NO_2/NO_x$ mole ratios out of the DOC 110 based on the $NO_x$ fraction in the exhaust stream 104, and/or based on the temperature of the DOC 110. Without limitation, interpreting the performance criteria 212 may comprise reading the criteria from a datalink, reading the criteria from a data memory location, measuring the criteria electronically, or calculating the criteria from other parameters according to a defined function or algorithm.

The controller 124 may further comprise a fraction determination module 214 configured to determine a first fraction 108 target based on the plurality of operating conditions 204, the operating criteria 208, and the performance criteria 212. In one embodiment, the fraction determination module 214 may determine a first fraction target 216 such that if the first fraction 108 achieves the first fraction target 216, an optimal $NO_2/NO_x$ mole ratio is achieved at the mixing component 116.

For example, the optimal $NO_2/NO_x$ mole ratio at the mixing component 116 may be 0.5, a current $NO_2/NO_x$ mole ratio in the exhaust stream 104 may be 0.1, the exhaust stream 104 may be flowing at 20 lbm/min, the DOC 110 temperature may be 300 deg C., and the performance criteria for the DOC 110 may indicate an $NO_2/NO_x$ mole ratio out of the DOC 110 of 0.83 at 5 lbm/min flow through the DOC 110, 0.65 at 20 lbm/min flow through the DOC 110, with a linear interpolation of $NO_2/NO_x$ mole ratio between the defined flow rates. For the example, the fraction determination module 214 may determine that a first fraction 108 of 0.623, or 12.45 lbm/min through the DOC 110 and 7.55 lbm/min through the fluid conduit 114, would yield a $NO_2/NO_x$ mole ratio of approximately 0.5 at the mixing component 116. In the example, the fraction determination module 214 sets the first fraction target 216 to 0.623.

The controller 124 may further comprise an emissions module 210 configured to determine a minimum first fraction value 220 based on an emissions compliance scheme 222. For example, the conditioning component 110 may comprise a diesel particulate filter (DPF), the emissions compliance scheme 222 may indicate a maximum particulate emissions level of 0.01 grams/hp-hour, the operating conditions 204 may indicate that the engine is emitting 0.03 grams/hp-hour of particulates, and the performance criteria 212 may indicate that the DPF is removing 95% of the engine 102 out particulates. In the example, the emissions module 210 may determine that the minimum first fraction value 220 must be 0.103 for the system 100 to meet the emissions requirements.

In an alternate example, the emissions compliance scheme 222 may indicate that the bypass valve 106 may not bypass more than 30% of the exhaust flow 104 past the conditioning component 110, and only for fifteen minutes out of each hour of engine 102 operation. In the example, the emissions module 210 determines whether bypass time is available under the emissions scheme 222. If bypass time is available, the emissions module 210 may set the first fraction value 220 to 70%, and if bypass time is not available, the emissions module 210 may set the first fraction value 220 to 100%.

The fraction determination module 214 may be further configured to determine the first fraction target 216 based on the first fraction value 220. For example, the fraction determination module 214 may determine the ideal first fraction 108 for the target component 120, and set the first fraction target 216 to the greater of the first fraction value 220 and the ideal first fraction 108 for the target component 120. The fraction determination module 214 may utilize other relevant considerations in determining the first fraction target 216. For example, the fraction determination module 214 may override the first fraction value 220 in a condition where a failure has occurred in the system 100.

The controller 124 may further comprise a valve position module 218. The valve position module 218 may be configured to manipulate the bypass valve 106 position based on the first fraction target 216. For example, the first fraction target 216 may be 0.60, the bypass valve position 106 required to meet the first fraction target 216 may be 0.83, and the current bypass valve position 106 may be 0.40. In the example, the valve position module 218 may operate a proportional-integral-derivative (PID) controller to command the valve 106 to the position 0.83. The control of the valve may comprise a command on a datalink, an electronic signal, and the like. The valve position module 218 may override the first fraction target 216 in certain circumstances, for example where a failure has occurred in the system 100.

Figure 3:
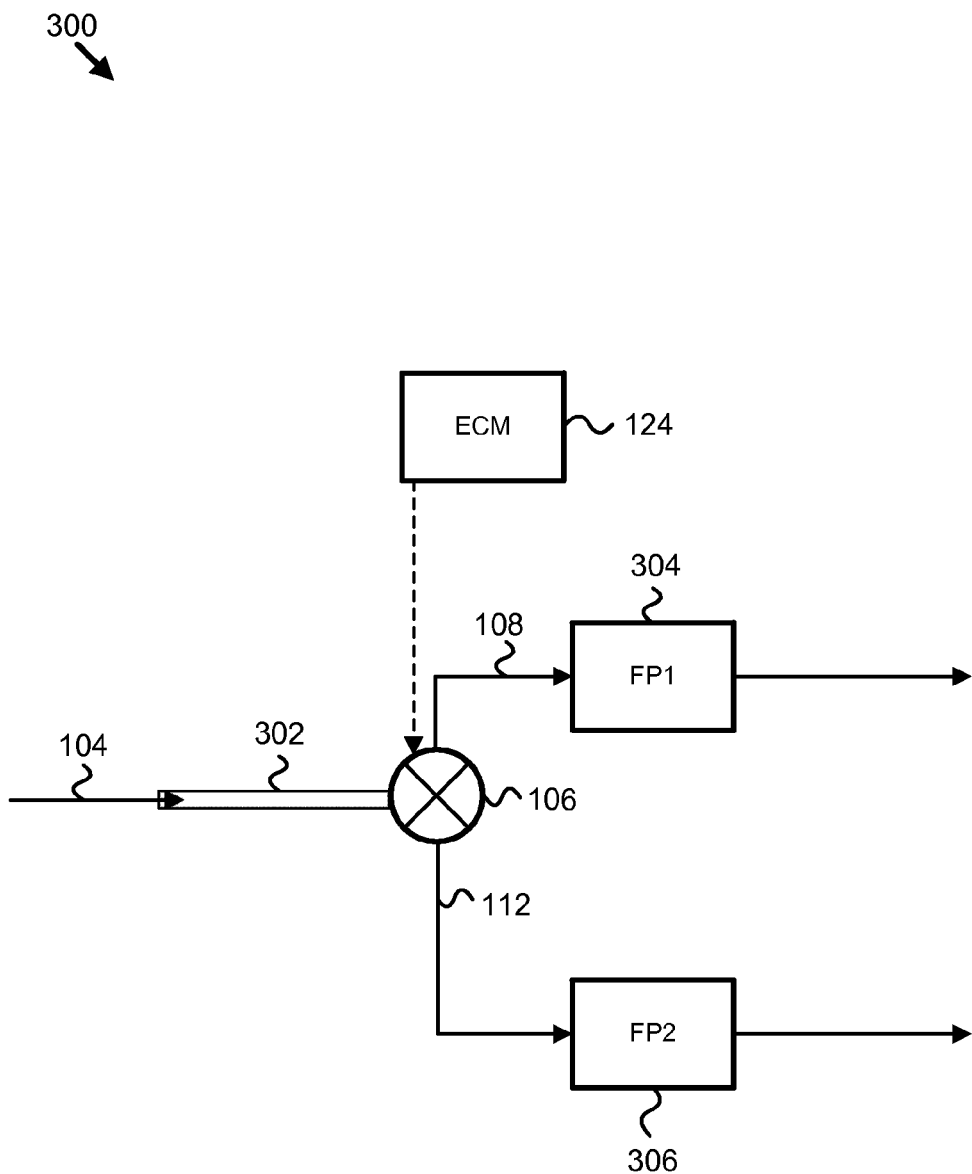
FIG. 3 is a schematic block diagram depicting one embodiment of an apparatus for enhancing the efficiency of an exhaust aftertreatment system in accordance with the present invention.

FIG. 3 is a schematic block diagram depicting one embodiment of an apparatus 300 for enhancing the efficiency of an exhaust aftertreatment system 103 in accordance with the present invention. The apparatus 300 may comprise an intake module 302 which may comprise a fluid conduit configured to receive a fluid stream 104. The apparatus may further comprise a bypass valve 106 configured to direct a first fraction 108 of the fluid stream 104 to a first flowpath 304, wherein the first fraction 108 comprises an amount between zero and one hundred percent inclusive of the fluid stream 104. The first flowpath 304 may comprise one or more conditioning components which may comprise aftertreatment components such as a DOC and/or a DPF.

The bypass valve 106 may be further configured to direct a second fraction 112 of the fluid stream 104 to a second flowpath 306, wherein the second fraction 112 comprises an amount such that the first fraction 108 added to the second fraction 112 comprise one hundred percent of the fluid stream 104. The second flowpath may comprise one or more aftertreatment components, and/or a fluid conduit configured to convey the second fraction 112 of the fluid stream 104. The apparatus 300 may further comprise a controller 124 which may comprise a sensing module 202, a target selection module 206, a conditioning performance module 210, and a fraction determination module 214.

Figure 4:
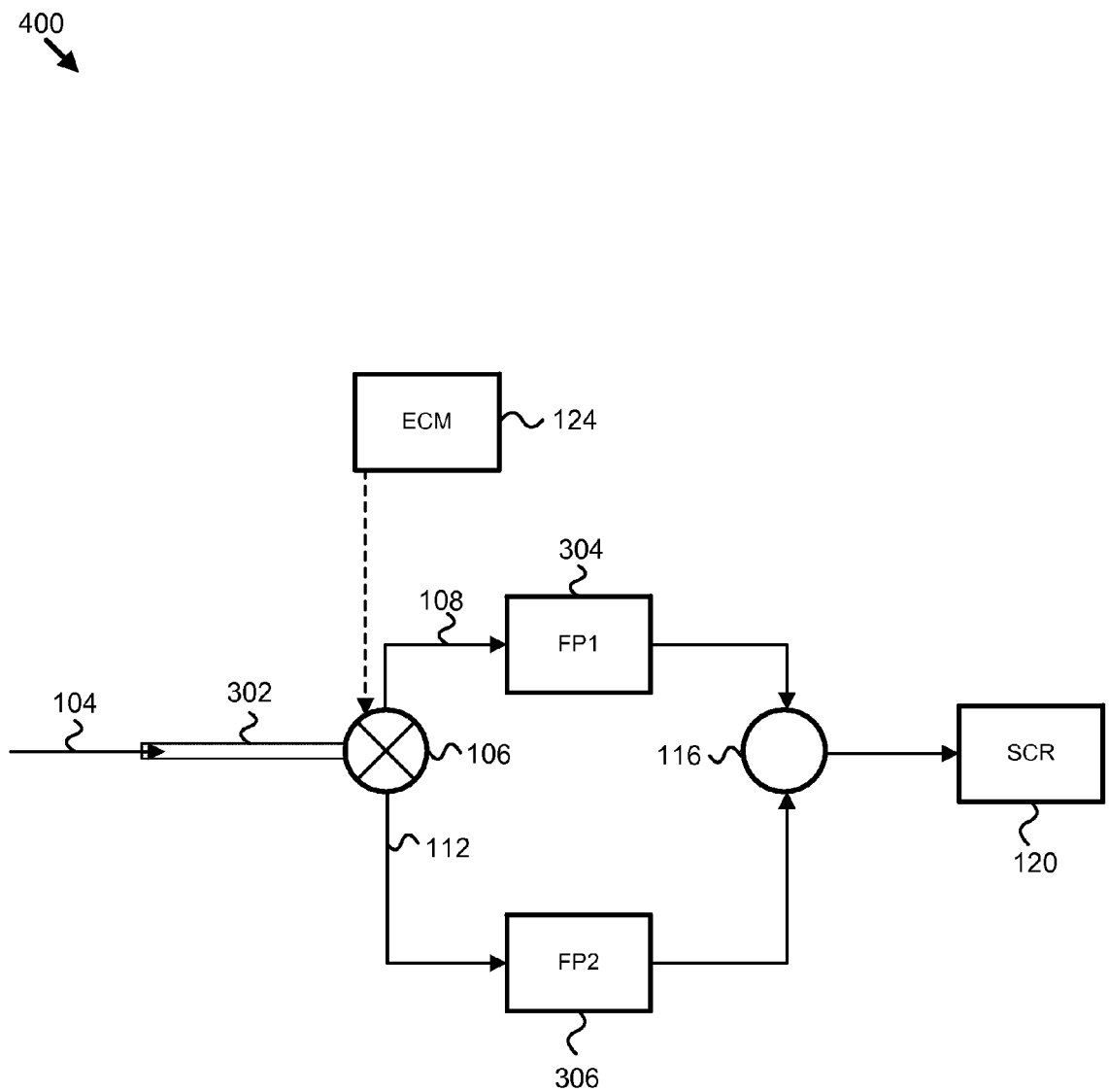
FIG. 4 is a schematic block diagram depicting an alternate embodiment of an apparatus for enhancing the efficiency of an exhaust aftertreatment system in accordance with the present invention.

FIG. 4 is a schematic block diagram depicting an alternate embodiment of an apparatus 400 for enhancing the efficiency of an exhaust aftertreatment system 103 in accordance with the present invention. In addition to the embodiment described in FIG. 3, the apparatus 400 may further comprise a mixing component 116 configured to combine the flow from the first flowpath 304 with the flow from the second flowpath 306. The apparatus 400 may further comprise a target component 120 which may be an SCR component configured to receive the combined flow from the mixing component, and further configured to reduce $NO_x$ within the exhaust stream 104 to $N_2$. In the embodiment of FIG. 4, the controller 124 may manipulate the bypass valve 106 to enhance the efficiency of the SCR component 120.

Figure 5:
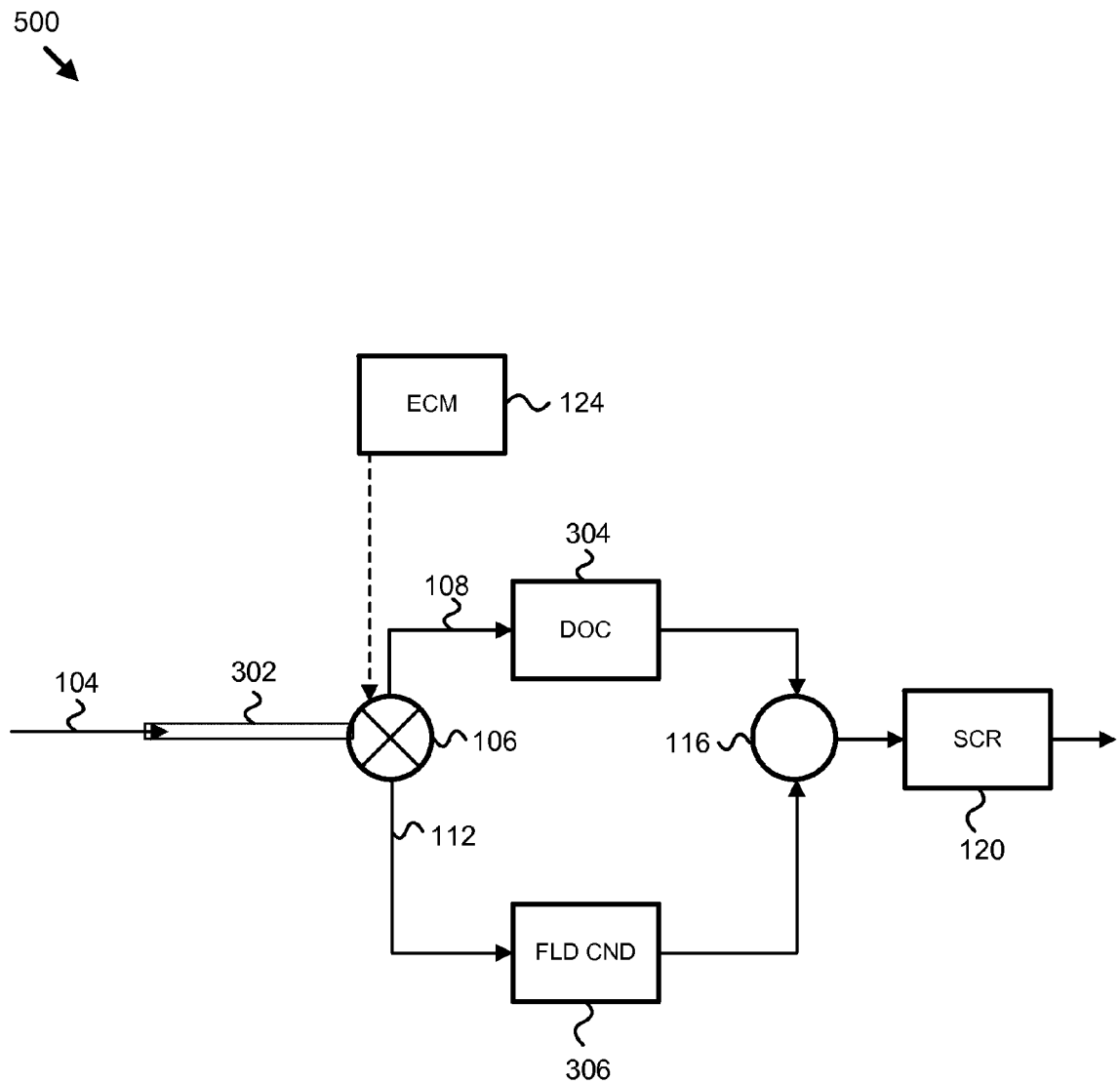
FIG. 5 is a schematic block diagram depicting an alternate embodiment of an apparatus for enhancing the efficiency of an exhaust aftertreatment system in accordance with the present invention.

FIG. 5 is a schematic block diagram depicting an alternate embodiment of an apparatus 500 for enhancing the efficiency of an exhaust aftertreatment system 103 in accordance with the present invention. In addition to the description in FIG. 4, the apparatus 500 may further comprise a first flowpath 304 comprising a conditioning component which may be a DOC, and a second flowpath 306 comprising a fluid conduit. The DOC 304 may be configured to convert a portion of the NO in the exhaust stream 104 to $NO_2$, and the fluid conduit 306 may be configured to deliver the second fraction 112 of the exhaust stream 104 to the mixing component 116.

The operating conditions 204 may comprise a fluid stream 104 mass flow rate, a $NO_x$ fraction in the fluid stream 104, an $NO_2/NO_x$ mole ratio in the fluid stream 104, and a temperature of the DOC 304. The performance criteria 212 may comprise an $NO_2/NO_x$ mole ratio out of the DOC 304 based on a flow rate through the DOC 304, and a temperature of the DOC 304. The operating criteria 208 may comprise a $NO_x$ to $N_2$ conversion based on an $NO_2/NO_x$ mole ratio into the SCR component 120.

In the embodiment of FIG. 5, the controller 124 may manipulate the bypass valve 106 to enhance the efficiency of the SCR component 120. In one embodiment, the apparatus 500 may be configured such that the fluid conduit 306 comprises a lower thermal capacitance than the DOC 304, and the controller 124 may be configured to bypass some or all of the exhaust flow 104 past the DOC 304 at some operating conditions where the SCR component 120 should be heated as quickly as possible. In the example embodiment, the apparatus 500 enhances the efficiency of the aftertreatment system 103 by reducing the time and fuel cost for the SCR component 120 to begin operating effectively after a cooldown.

Figure 6:
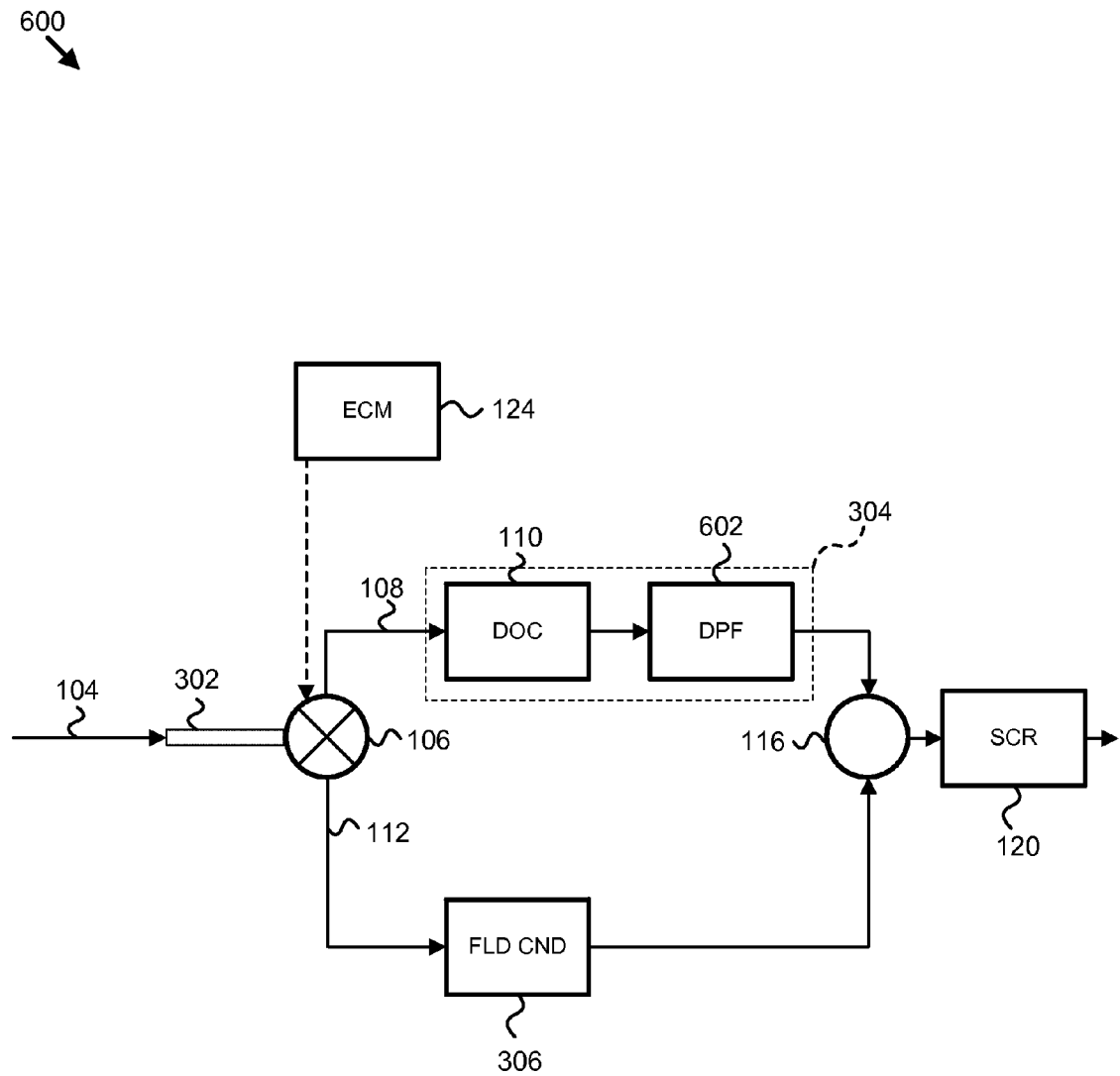
FIG. 6 is a schematic block diagram depicting an alternate embodiment of an apparatus for enhancing the efficiency of an exhaust aftertreatment system in accordance with the present invention.

FIG. 6 is a schematic block diagram depicting an alternate embodiment of an apparatus 600 for enhancing the efficiency of an exhaust aftertreatment system 103 in accordance with the present invention. In addition to the description in FIG. 5, the apparatus 600, the first flowpath 304 may comprise two conditioning components, a DOC 110 and a DPF 602. The DOC 110 may be configured to convert a portion of the NO in the exhaust stream 104 to $NO_2$, and the fluid conduit 306 may be configured to deliver the second fraction 112 of the exhaust stream 104 to the mixing component 116. The DPF 602 may be configured to filter particulate matter from the first fraction 108, to convert some NO to $NO_2$ via catalytic oxidation, and/or to convert some $NO_2$ to NO when oxidizing soot via an $NO_2$ based mechanism.

In the embodiment of FIG. 6, the controller 124 may manipulate the bypass valve 106 to enhance the efficiency of the SCR component 120. The operating condition 204 may further include the temperature of the SCR component 120. In one embodiment, the apparatus 600 may be configured such that the fluid conduit 306 comprises a lower thermal capacitance than the first flowpath 304, and the controller 124 may be configured to bypass some or all of the first flowpath 304 at some operating conditions where the SCR component 120 should be heated as quickly as possible. In the example embodiment, the apparatus 600 enhances the efficiency of the aftertreatment system 103 by reducing the time and fuel cost for the SCR component 120 to begin operating effectively after a cooldown.

In one embodiment, the apparatus 600 is configured to enhance the efficiency of the exhaust aftertreatment system 103 by bypassing a portion of the first flowpath 304 to reduce backpressure on the engine from the DPF 602, and/or to generate temperature quickly within the first flowpath 304 to provide more rapid and fuel efficient oxygen-based regeneration of the DPF 602.

Figure 7:
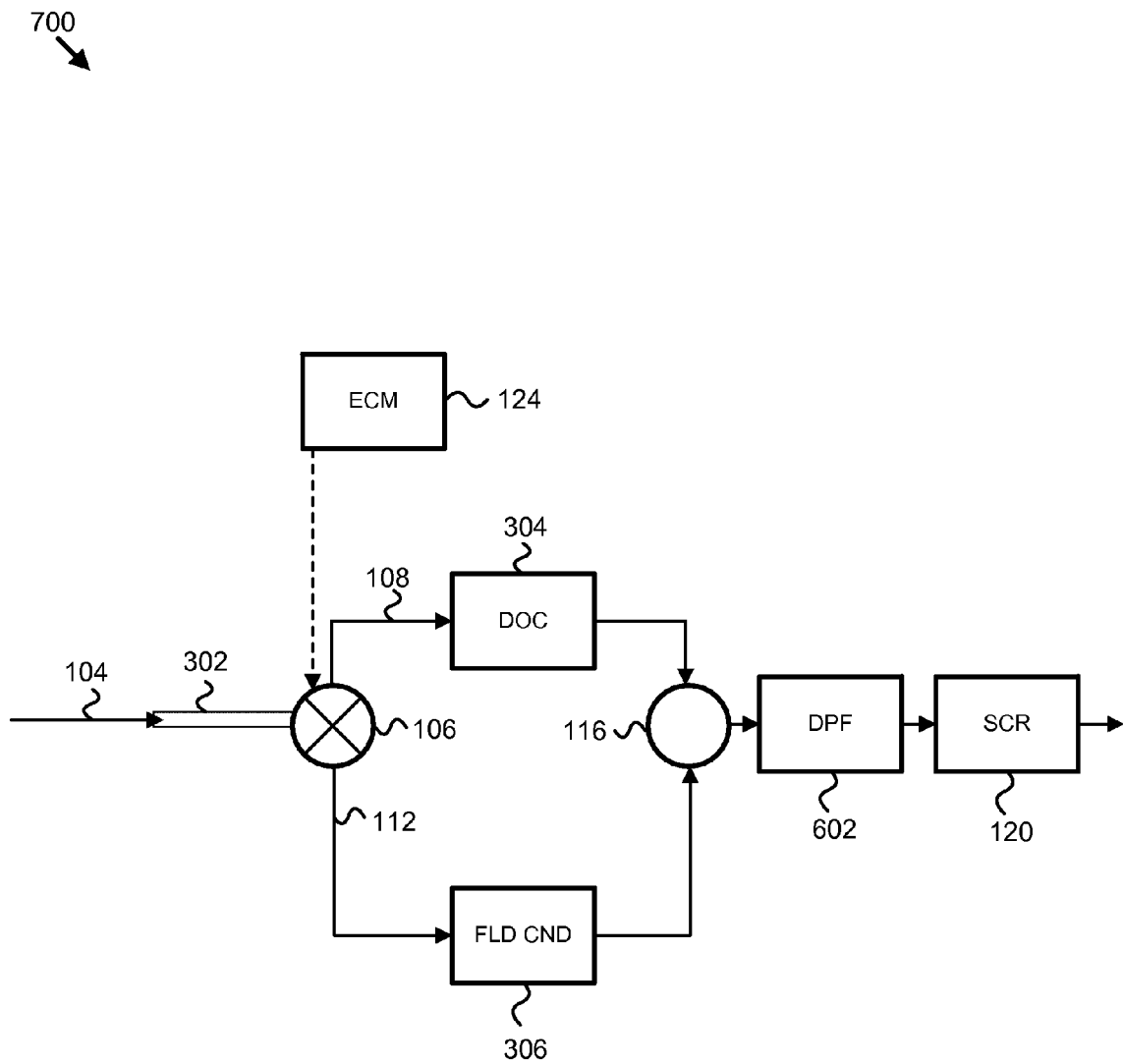
FIG. 7 is a schematic block diagram depicting an alternate embodiment of an apparatus for enhancing the efficiency of an exhaust aftertreatment system in accordance with the present invention.

FIG. 7 is a schematic block diagram depicting an alternate embodiment of an apparatus 700 for enhancing the efficiency of an exhaust aftertreatment system 103 in accordance with the present invention. In addition to the description in FIG. 5, the apparatus 700 may include second target component which may be a DPF 602.

In the embodiment of FIG. 7, the controller 124 may manipulate the bypass valve 106 to enhance the efficiency of the SCR component 120 and/or the DPF 602. The DOC 304 may be configured to convert NO to $NO_2$. The controller 124 may be configured to manipulate the bypass valve 106 to achieve an optimal $NO_2/NO_x$ mole ratio at the mixing component 116 for the SCR component 120, and/or to achieve a sufficient $NO_2$ level at the mixing component 116 to support oxidation of soot within the DPF 602 while meeting constraints on maximum $NO_2$ levels due to emissions, sociability, and other concerns.

The operating criteria 208 may thereby comprise an NO2 flow rate into the DPF 602, and standard prioritization algorithms may be utilized to select between meeting the $NO_2$ levels optimal for the DPF 602 and the $NO_2$ levels optimal for the SCR component 120. For example, the DPF 602 component may be presumed, in one embodiment, to never request an NO2 flow rate unless a soot regeneration is required, therefore in the example the DPF 602 request always wins if present, while the SCR component 120 request is met whenever a DPF 602 request is not present.

Figure 8:
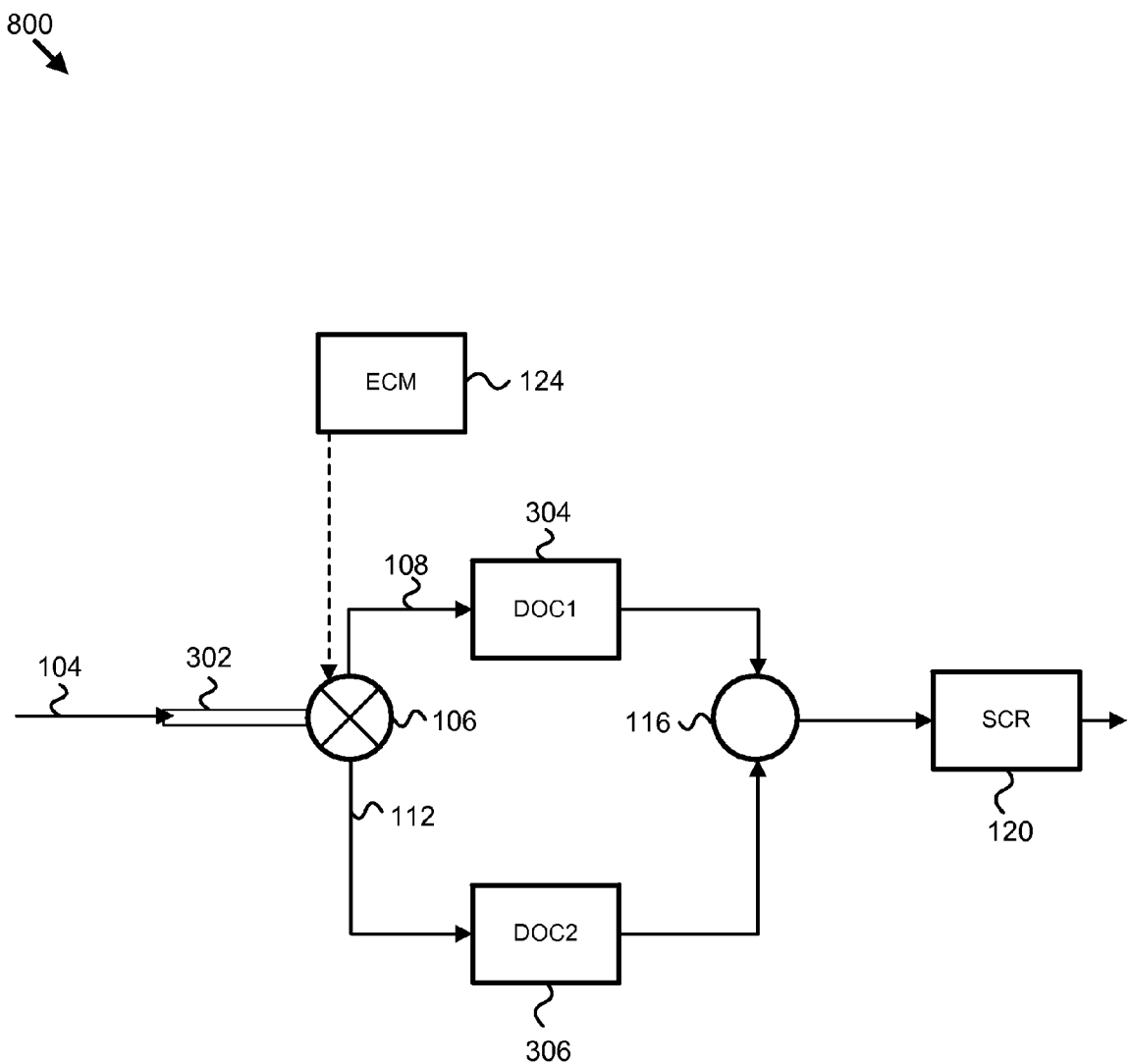
FIG. 8 is a schematic block diagram depicting an alternate embodiment of an apparatus for enhancing the efficiency of an exhaust aftertreatment system in accordance with the present invention.

FIG. 8 is a schematic block diagram depicting an alternate embodiment of an apparatus 800 for enhancing the efficiency of an exhaust aftertreatment system 103 in accordance with the present invention. In addition to the description in FIG. 5, the apparatus 800 may include a second conditioning component 306, which may be a second DOC, in the second flowpath. In one embodiment, the second DOC 306 may be configured to convert a portion of the NO in the second fraction 112 to $NO_2$. The operating conditions 204 may further comprise a temperature of the second DOC 306. In one embodiment, the performance criteria may further comprise a second $NO_2/NO_x$ mole ratio out of the second DOC based on a flow rate through the second DOC.

One potential advantage of an embodiment corresponding to FIG. 8 is that all of the fluid stream 104 is treated with a catalyst, rather than some of the fluid stream 104 completely bypassing all catalysts. For example, the first DOC 304 may be configured with the NO to NO2 conversion capacity that may be required at a low engine load like idle. The second DOC 306 may be configured with the additional NO to $NO_2$ conversion capacity that would be required at full engine load. Rather than bypassing flow through a fluid conduit that would not clean up unburned hydrocarbons, all of the flow passes through a DOC and hydrocarbons are cleaned up, while at the same time the NO to $NO_2$ conversion capacity can be optimized. The embodiment of FIG. 8 may be more expensive than a single DOC embodiment, and therefore both embodiments are useful and the economics, or other appropriate decision criteria, of a particular application should be used to determine an appropriate implementation for each application.

Figure 9:
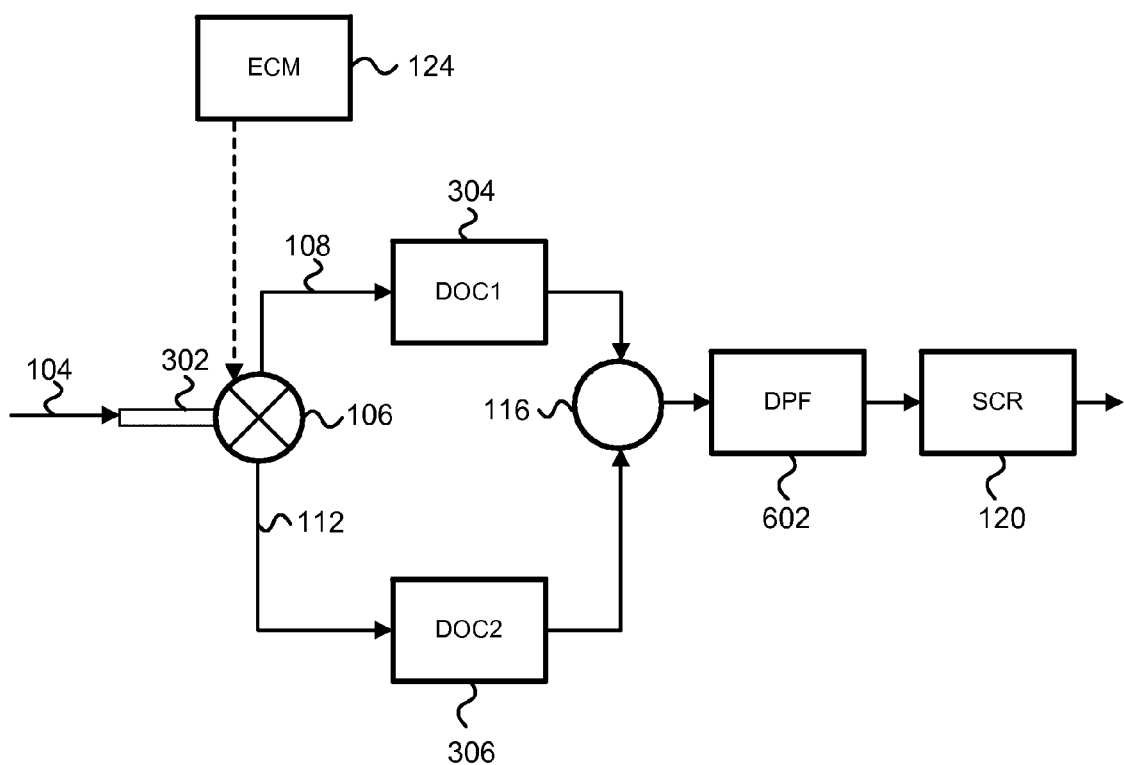
FIG. 9 is a schematic block diagram depicting an alternate embodiment of an apparatus for enhancing the efficiency of an exhaust aftertreatment system in accordance with the present invention.

FIG. 9 is a schematic block diagram depicting an alternate embodiment of an apparatus 900 for enhancing the efficiency of an exhaust aftertreatment system 103 in accordance with the present invention. In addition to the description in FIG. 8, the apparatus 900 may include a second target component 602 which may be a DPF. The DPF 602 may be configured to receive the combined flow from the mixing component 116. The operating criteria 208 for the DPF may comprise a soot oxidation rate based on an $NO_2$ flow rate into the DPF.

Figure 10:
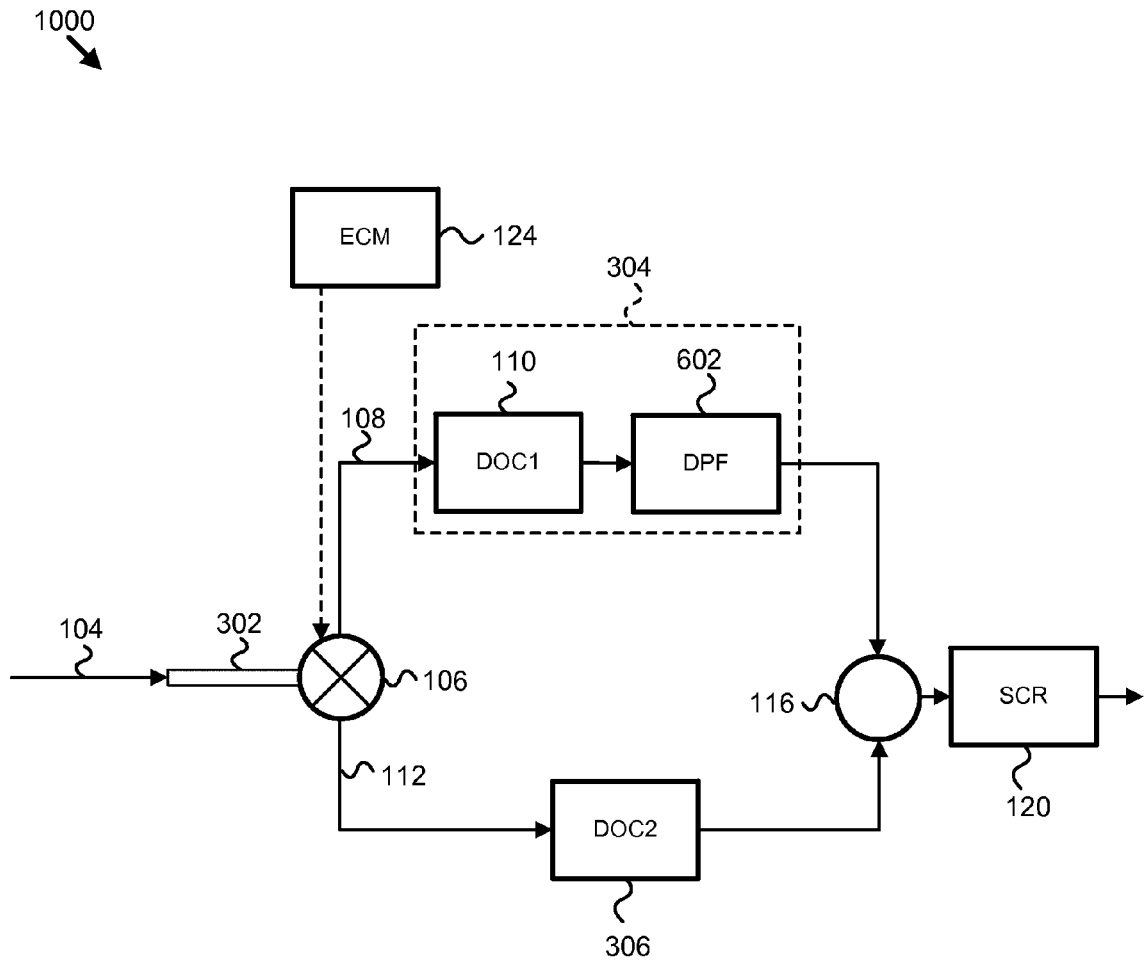
FIG. 10 is a schematic block diagram depicting an alternate embodiment of an apparatus for enhancing the efficiency of an exhaust aftertreatment system in accordance with the present invention.

FIG. 10 is a schematic block diagram depicting an alternate embodiment of an apparatus 1000 for enhancing the efficiency of an exhaust aftertreatment system 103 in accordance with the present invention. In addition to the description in FIG. 8, the apparatus 1000 may comprise a first and second conditioning component 602 in the first flowpath 304. The first conditioning component 110 may be a first DOC, and the second conditioning component 602 may be a DPF.

Figure 11:
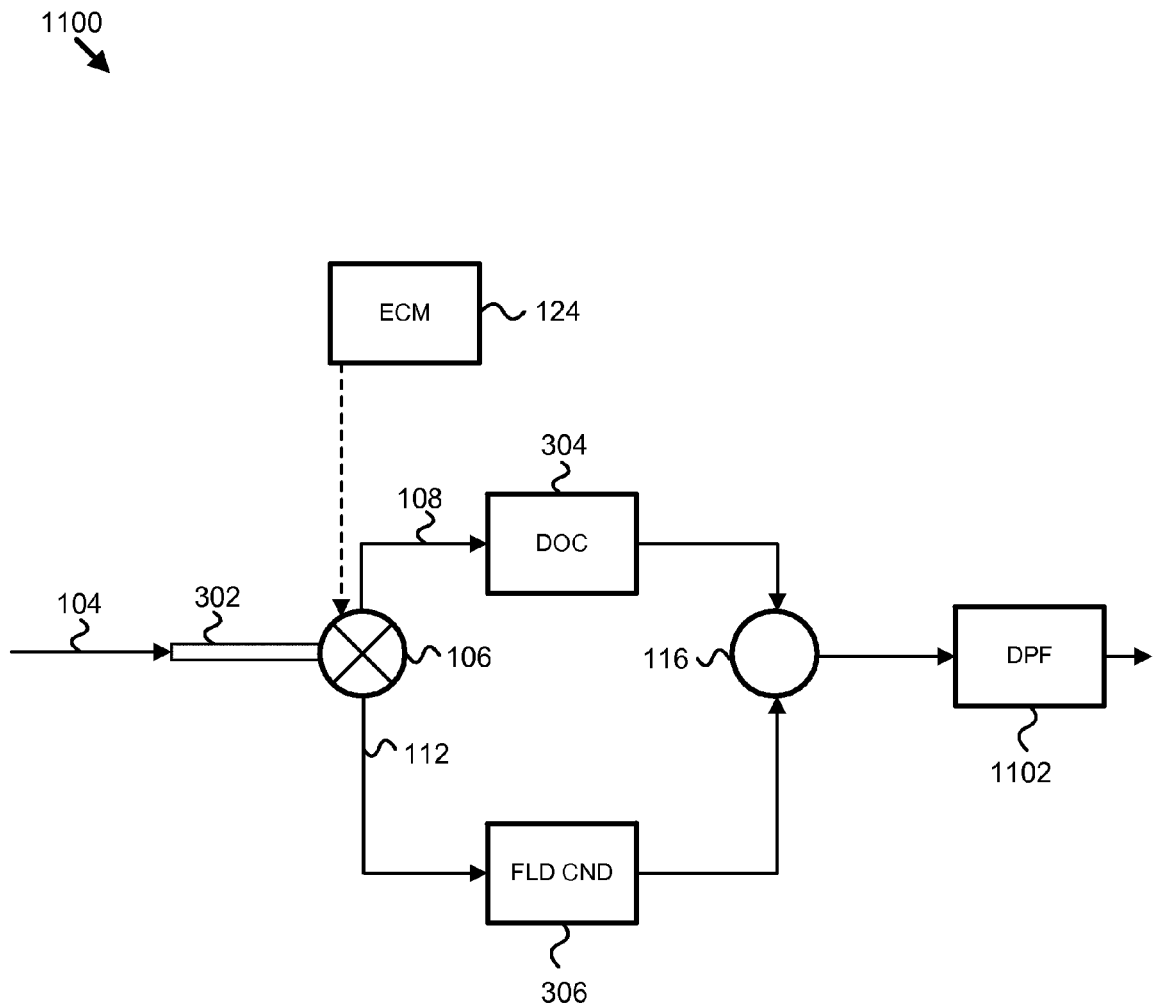
FIG. 11 is a schematic block diagram depicting an alternate embodiment of an apparatus for enhancing the efficiency of an exhaust aftertreatment system in accordance with the present invention.

FIG. 11 is a schematic block diagram depicting an alternate embodiment of an apparatus 1100 for enhancing the efficiency of an exhaust aftertreatment system 103 in accordance with the present invention. In addition to the description of FIG. 3, the first flowpath 304 may comprise a DOC, and the second flowpath 306 may comprise a fluid conduit. The apparatus 1100 may further comprise a mixing component 116.

The apparatus 1100 may further comprise at least one target component which may be a DPF 1102. The performance criteria 212 for the DOC 304 may comprise an $NO_2/NO_x$ mole ratio out of the DOC 304 based on a flow rate through the DOC 304. The operating criteria 208 for the DPF 306 may comprise a soot oxidation rate based on an $NO_2$ flow rate into the DPF 306. The at least one operating condition 204 may comprise a mass flow rate of the fluid stream, a NOx concentration of the fluid stream 104, a temperature of the DOC, and a temperature of the DPF.

One embodiment of FIG. 11 may be useful where the DPF 306 utilizes an $NO_2$ based regeneration as a primary mechanism for oxidizing soot from the DPF 306. The DOC 304 can be configured to convert most of the available $NO_x$ from the fluid stream 104 to $NO_2$. During many operating conditions, generating such a quantity of $NO_2$ may create excessive brown smoke or other issues. Therefore, when large quantities of $NO_2$ are unnecessary, the controller 124 can bypass much of the fluid stream 104 around the DOC 304 to prevent these issues.

Figure 12:
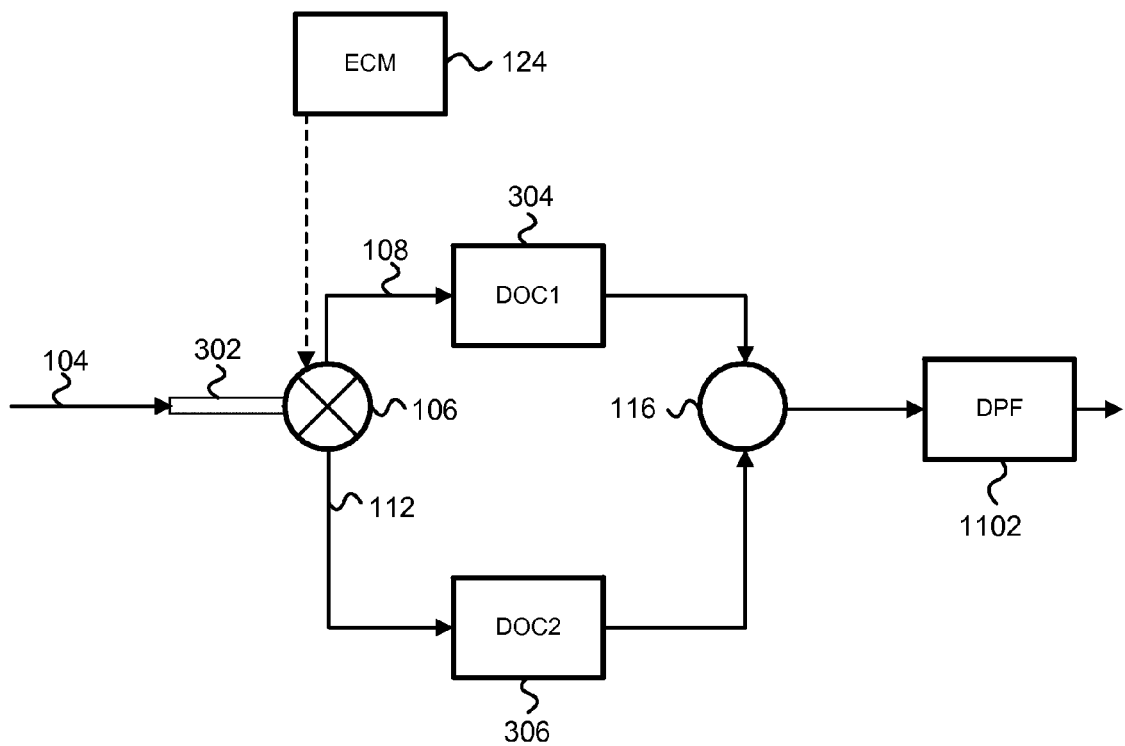
FIG. 12 is a schematic block diagram depicting an alternate embodiment of an apparatus for enhancing the efficiency of an exhaust aftertreatment system in accordance with the present invention.

FIG. 12 is a schematic block diagram depicting an alternate embodiment of an apparatus 1200 for enhancing the efficiency of an exhaust aftertreatment system 103 in accordance with the present invention. In addition to the description of FIG. 11, one embodiment of FIG. 12 may comprise a second DOC 306 in the second flowpath. Similar to the embodiment of FIG. 8, this may increase the costs of the apparatus 1200, but provides capabilities that bypassing through fluid conduit will not provide.

Figure 13:
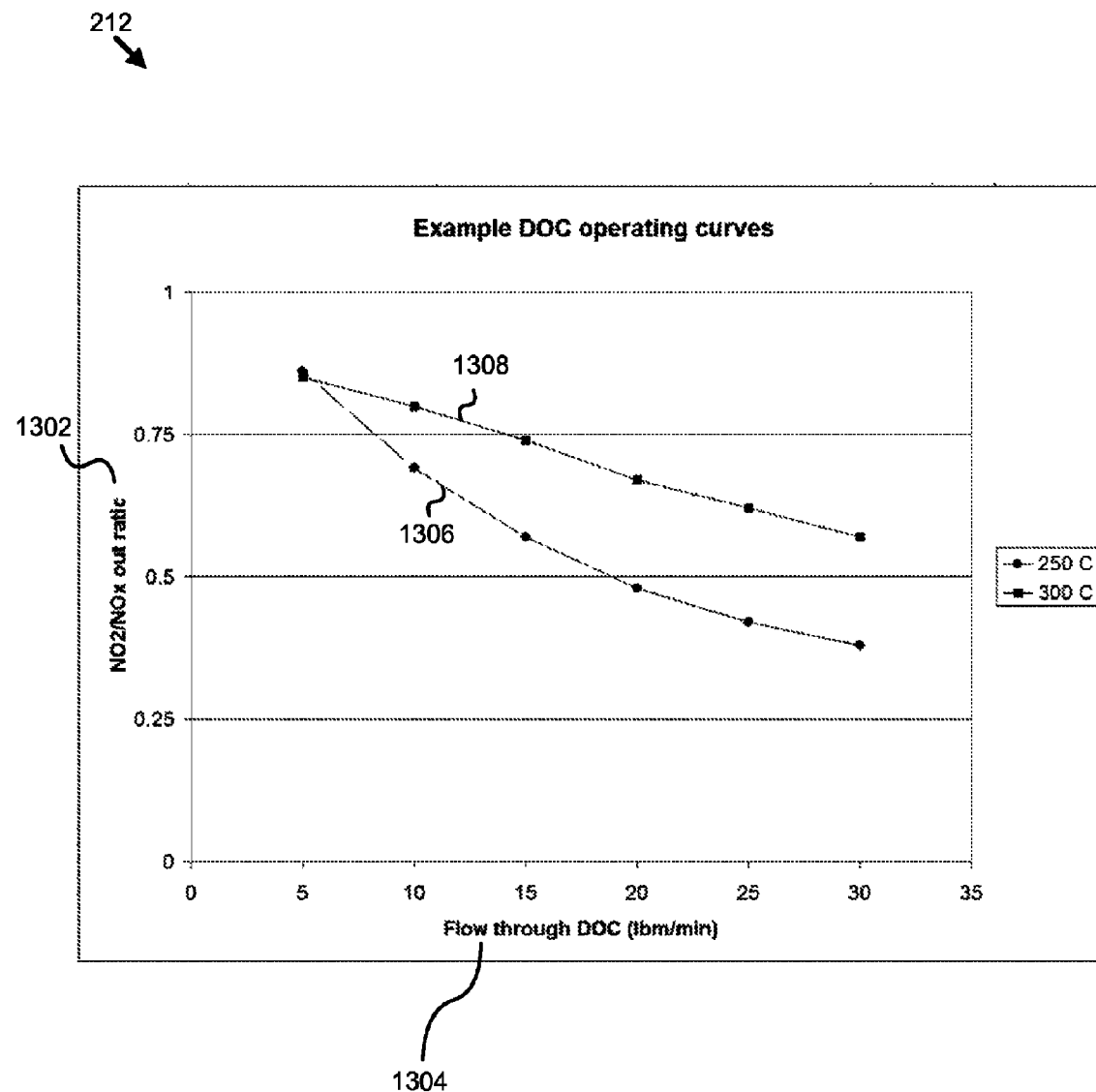
FIG. 13 is an illustration of one embodiment of performance criteria for a conditioning component in accordance with the present invention.

FIG. 13 is an illustration of one embodiment of performance criteria 212 for a conditioning component 304, 306 in accordance with the present invention. In one embodiment, the performance criteria 212 may comprise an NO2/NOx mole ratio 1302 out of a DOC 110 based on a flowrate through the DOC 110. In one embodiment, the performance criteria 212 is dependent upon the temperature of the DOC 110, and therefore multiple curves 1306, 1308 based on temperature may be provided. In a further embodiment, the performance criteria 212 is dependent upon the $NO_2/NO_x$ mole ratio entering the DOC, and multiple curves (not shown) based on $NO_2/NO_x$ mole ratio entering the DOC may be provided.

The curves shown in FIG. 13 comprise discrete data points with linear interpolation between data points. However, functions, model equations, table lookups, non-linear interpolation, extrapolation, and other data storage and retrieval techniques are contemplated within the scope of the invention for the performance criteria 212.

Figure 14:
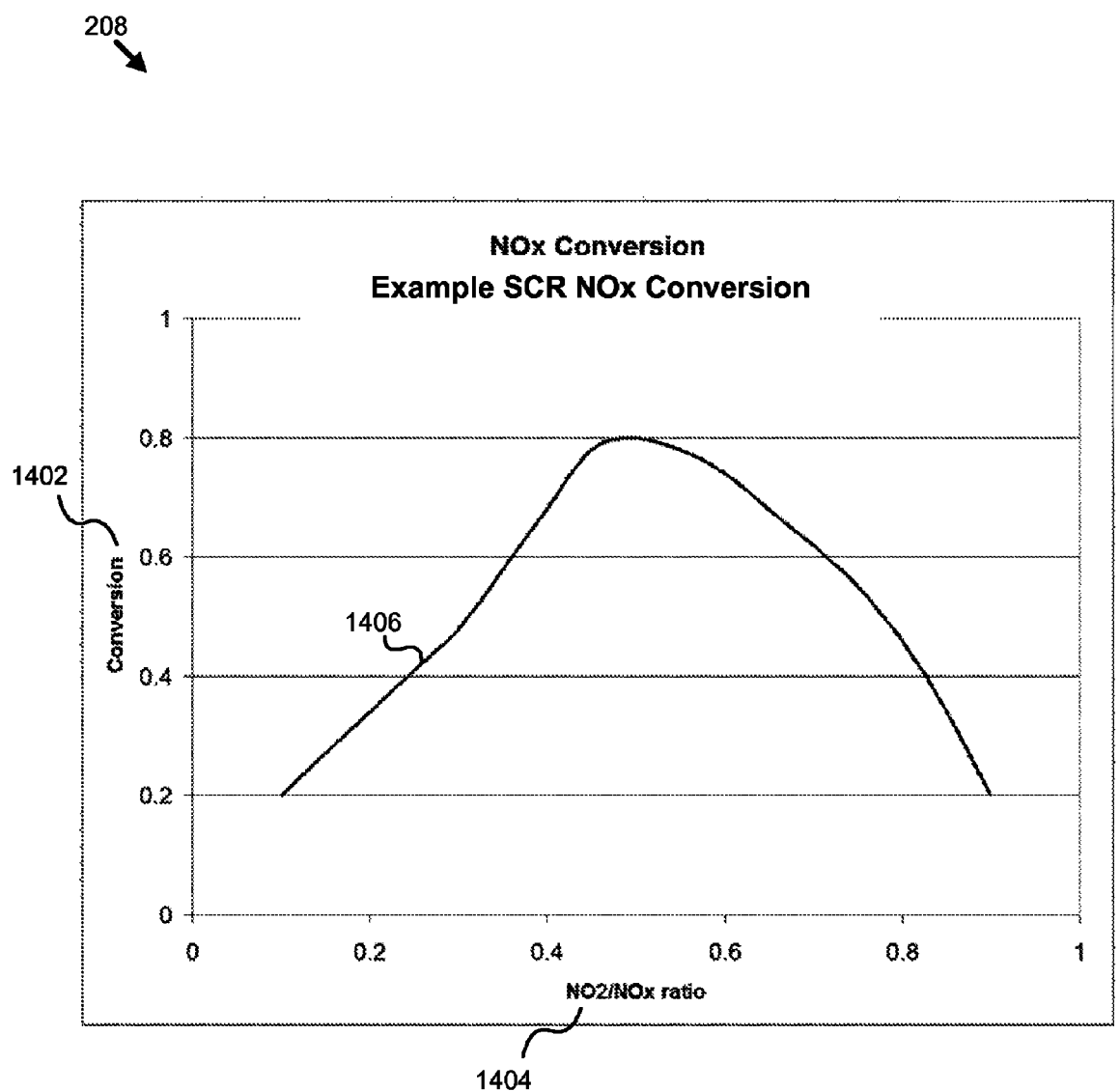
FIG. 14 is an illustration of one embodiment of operating criteria for a target component in accordance with the present invention.

FIG. 14 is an illustration of one embodiment of operating criteria 208 for a target component 120 in accordance with the present invention. The operating criteria 208 may comprise a $NO_x$ to $N_2$ conversion 1402 based on an $NO_2/NO_x$ mole ratio 1404 into the SCR component. A single curve 1406 is illustrated in FIG. 14, although multiple curves may be developed based on the SCR 120 temperature, a total NOx flow rate into the SCR 120, and other parameters which may affect the final $NO_x$ to $N_2$ conversion.

Figure 15:
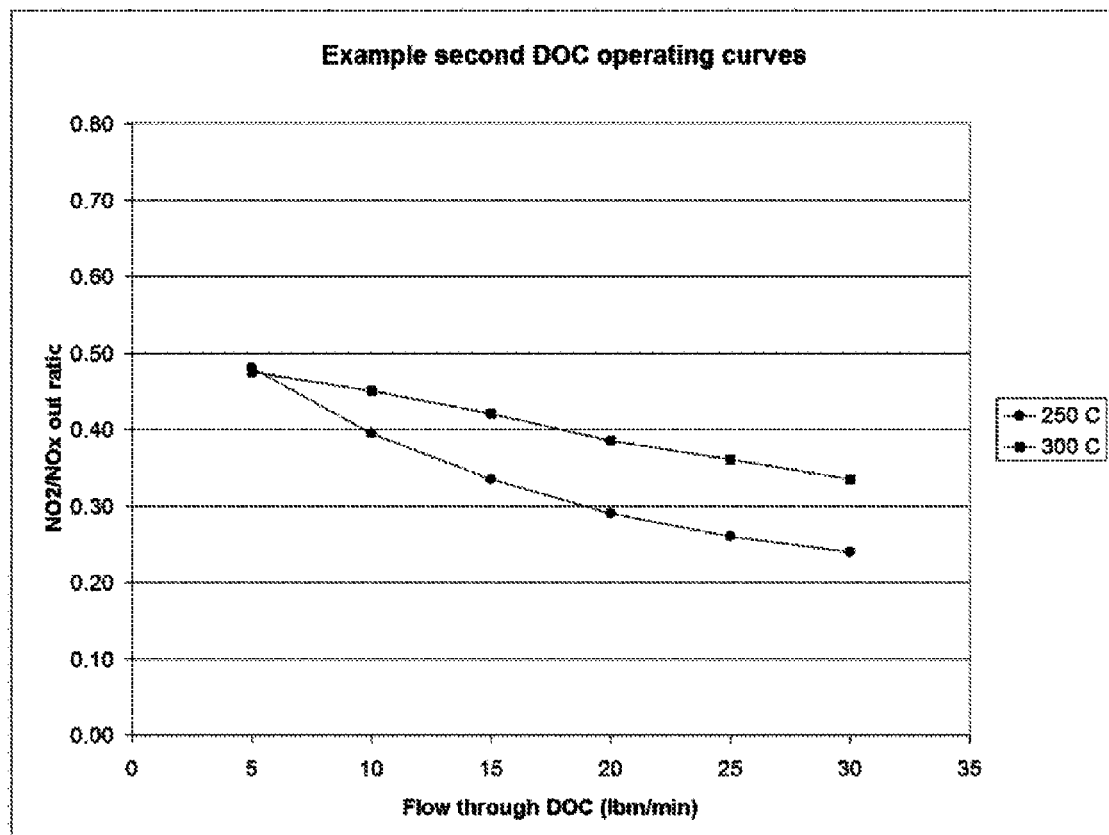
FIG. 15 is an illustration of one embodiment of performance criteria for a second conditioning component in accordance with the present invention.

FIG. 15 is an illustration of one embodiment of performance criteria 212 for a second conditioning component 306 in accordance with the present invention. The performance criteria 212 for the second conditioning component 306 may comprise a different set of performance curves than the performance criteria for the first conditioning component 304. The curves of FIG. 15 are consistent with a second DOC 306 with lower capacity than a first DOC 304 with performance curves shown in FIG. 13.

The schematic flow chart diagram included herein is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 16:
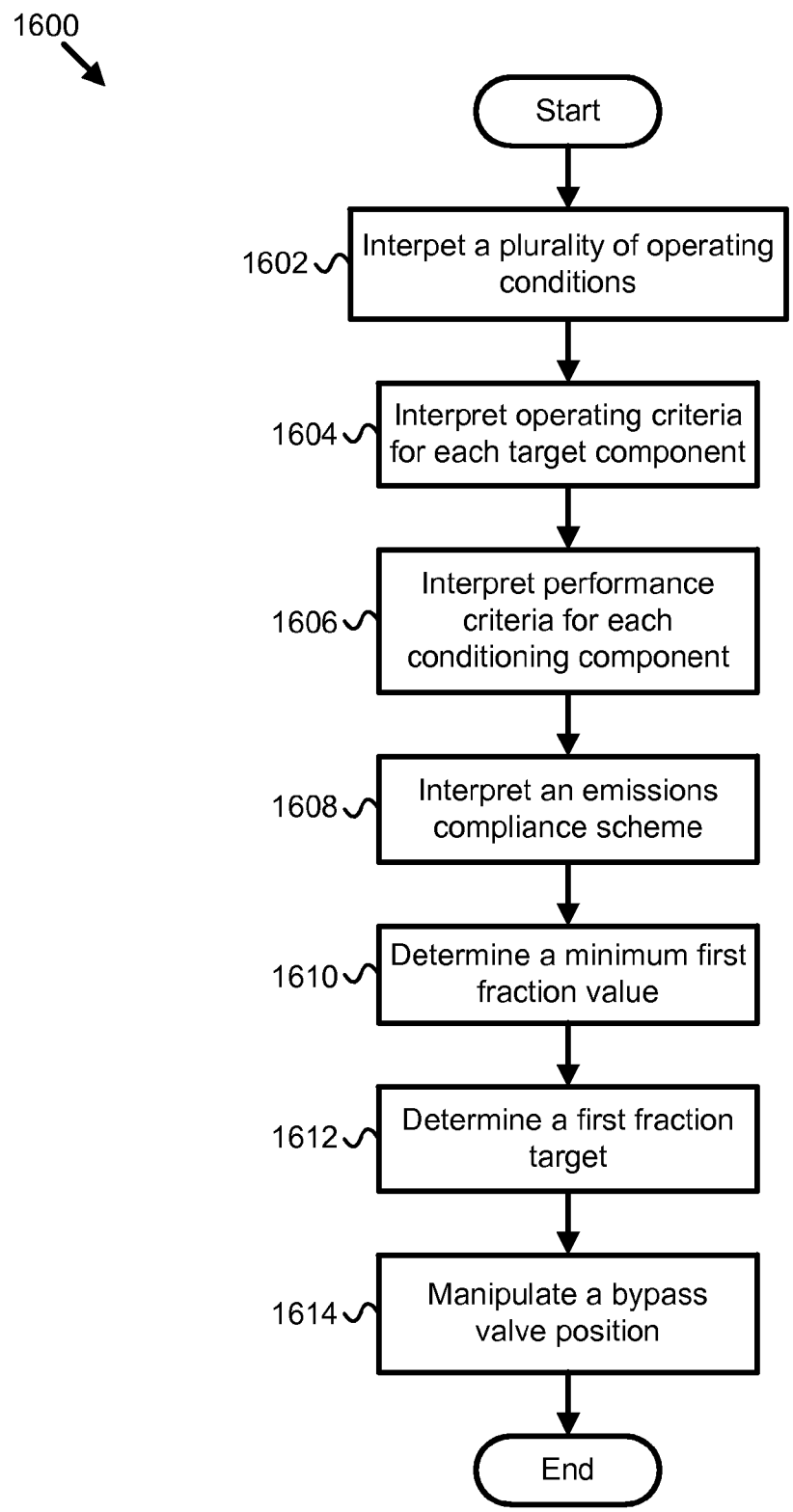
FIG. 16 is a schematic flow chart illustrating one embodiment of a method for enhancing the efficiency of an exhaust aftertreatment system in accordance with the present invention.

FIG. 16 is a schematic flow chart illustrating one embodiment of a method 1600 for enhancing the efficiency of an exhaust aftertreatment system 103 in accordance with the present invention. The method 1600 may comprise a computer program product comprising program code on a computer readable medium.

The method 1600 may include a sensing module 202 interpreting 1602 a plurality of operating conditions 204. A target selection module 206 may interpret 1604 operating criteria 208 for each of one or more target components. The target component may comprise an SCR component 120, and the operating criteria 208 may comprise a $NO_x$ to $N_2$ conversion based on an $NO_2/NO_x$ mole ratio into the SCR component 120. A conditioning performance module 210 may interpret 1606 performance criteria 212 for each of one or more conditioning components. An emissions module 218 may interpret an emissions compliance scheme 222 to determine a minimum first fraction value 220 for a first fraction 108 of a split fluid stream 104.

A fraction determination module 214 may determine 1612 a first fraction target 216 from the operating conditions 204, the operating criteria 208, the performance criteria 212, and the first fraction value 220. A valve position module 218 may manipulate 1614 a bypass valve 106 position based on the first fraction value 220.

Figure 17:
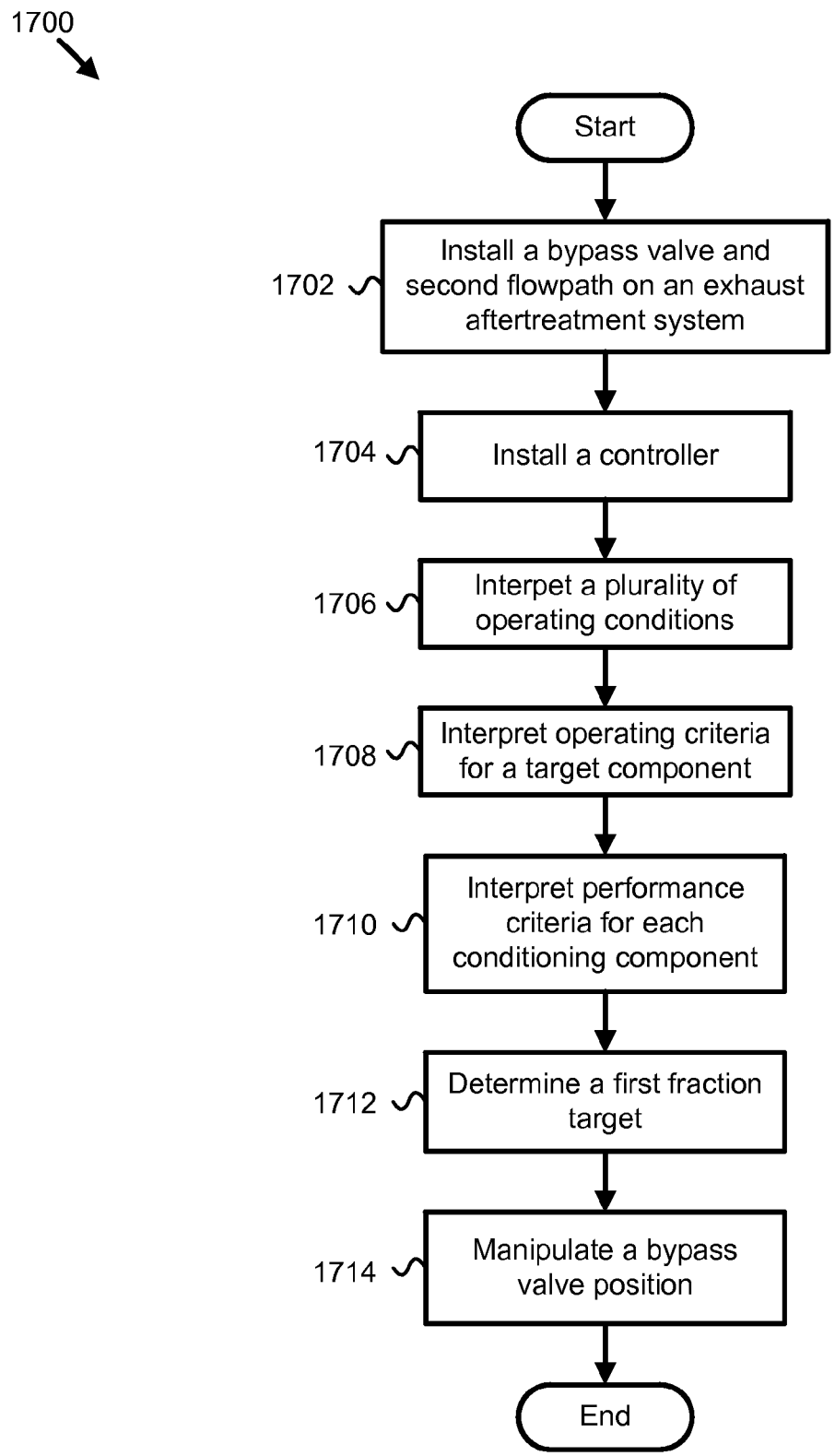
FIG. 17 is a schematic flow chart illustrating one embodiment of a method to modify an exhaust aftertreatment application in accordance with the present invention.

FIG. 17 is a schematic flow chart illustrating one embodiment of a method 1700 to modify an exhaust aftertreatment application 103 in accordance with the present invention. A practitioner may install 1702 a bypass valve 106 and a second flowpath 114 on an existing exhaust aftertreatment system 103. The practitioner may further install 1704 a controller 124 on the existing exhaust aftertreatment system 103.

A sensing module 202 may interpret 1602 a plurality of operating conditions 204. A target selection module 206 may interpret 1604 operating criteria 208 for each of one or more target components. The target component may comprise an SCR component 120, and the operating criteria 208 may comprise a $NO_x$ to $N_2$ conversion based on an $NO_2/NO_x$ mole ratio into the SCR component 120. A conditioning performance module 210 may interpret 1606 performance criteria 212 for each of one or more conditioning components.

A fraction determination module 214 may determine 1612 a first fraction target 216 from the operating conditions 204, the operating criteria 208, the performance criteria 212, and the first fraction value 220. A valve position module 218 may manipulate 1614 a bypass valve 106 position based on the first fraction value 220.

From the foregoing discussion, it is clear that the invention provides a system, method, and apparatus for enhancing the efficiency of an exhaust aftertreatment system. The invention overcomes previous limitations in the art by allowing a designer to optimally size aftertreatment components rather than over-designing them to cover the intended range of operation, and the invention allows the aftertreatment system to achieve operational temperatures quickly with a minimal energy input and efficiency loss.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for enhancing the efficiency of an exhaust aftertreatment system, the apparatus comprising:
   an intake module configured to receive a fluid stream;
   a bypass valve configured to direct a first fraction of the fluid stream to a first flowpath having a diesel oxidation catalyst (DOC) positioned therein, wherein the first fraction comprises an amount between zero and one hundred percent inclusive of the fluid stream;
   the bypass valve further configured to direct a second fraction of the fluid stream to a second flowpath to bypass the DOC;
   a controller comprising:
      a sensing module configured to interpret at least one operating condition;
      a target selection module configured to interpret operating criteria for each of at least one target component, the at least one target component comprising a selective catalytic reduction (SCR) component in fluid receiving communication with the fluid stream downstream of the bypass valve and the operating criteria comprising a desired $NO_x$ to $N_2$ conversion efficiency of the SCR component;
      a conditioning performance module configured to interpret performance criteria for each of at least one conditioning component, the at least one conditioning component comprising the DOC and the performance criteria comprising a DOC outlet $NO_2/NO_x$ mole ratio;
      a fraction determination module configured to determine a first fraction target based at least partially on the at least one operating condition, the desired $NO_x$ to $N_2$ conversion efficiency, and the DOC outlet $NO_2/NO_x$ mole ratio; and
      a valve position module configured to manipulate the bypass valve position based on the first fraction target to achieve an SCR inlet $NO_2/NO_x$ mole ratio corresponding with the desired $NO_x$ to $N_2$ conversion efficiency.

2. The apparatus of claim 1 further comprising a mixing component configured to combine the flow from the first flowpath with the flow from the second flowpath, and wherein the SCR component is configured to receive the combined flow from the mixing component and further configured to reduce nitrogen oxides to nitrogen within the combined flow.

3. The apparatus of claim 2, wherein the DOC is configured to convert a portion of nitric oxide (NO) flowing through the DOC to nitrogen dioxide ($NO_2$), wherein the second flowpath comprises a fluid conduit configured to deliver the second fraction to the mixing component, wherein the at least one operating condition comprises a fluid stream mass flow rate and a temperature of the DOC, wherein the DOC outlet $NO_2/NO_x$ mole ratio is based on a flow rate through the DOC and the temperature of the DOC, and wherein the desired $NO_x$ to $N_2$ conversion efficiency is based on the SCR inlet $NO_2/NO_x$ mole ratio.

4. The apparatus of claim 3, wherein the first flowpath further comprises a diesel particulate filter (DPF), and wherein the at least one operating condition further comprises a temperature of the SCR component.

5. The apparatus of claim 4, wherein the controller further comprises an emissions module configured to determine a minimum first fraction value based on an emissions compliance scheme; and wherein the fraction determination module is further configured to determine the first fraction target based on the minimum first fraction value.

6. The apparatus of claim 3, wherein the operating condition further comprises a $NO_x$ fraction in the fluid stream, an $NO_2/NO_x$ mole ratio in the fluid stream, and a temperature of the DOC.

7. The apparatus of claim 3, further comprising a diesel particulate filter (DPF) configured to receive the combined flow from the mixing component, wherein the SCR component is further configured to receive the flow from the DPF, and wherein the operating criteria comprises an $NO_2$ flow rate into the DPF.

8. The apparatus of claim 2:
   wherein the DOC is a first DOC and the first flowpath comprises the first DOC, the first DOC being configured to convert a portion of nitric oxide (NO) flowing through the first DOC to nitrogen dioxide ($NO_2$);
   wherein the second flowpath comprises a second conditioning component comprising a second diesel oxidation catalyst (DOC) configured to convert a portion of nitric oxide (NO) flowing through the second DOC to nitrogen dioxide ($NO_2$);
   wherein the at least one operating condition comprises a fluid stream mass flow rate, a NOx fraction in the fluid stream, a first temperature of the first DOC, and a second temperature of the second DOC; and
   wherein the DOC outlet $NO_2/NO_x$ mole ratio comprises a first DOC outlet $NO_2/NO_x$ mole ratio based on a flow rate through the first DOC, and a second DOC outlet $NO_2/NO_x$ mole ratio based on a flow rate through the second DOC; and
   wherein the desired $NO_x$ to $N_2$ conversion efficiency is based on the SCR inlet $NO_2/NO_x$ mole ratio.

9. The apparatus of claim 8, wherein the at least one target component further comprises a diesel particulate filter (DPF) configured to receive the combined flow from the mixing component, and the operating criteria for the DPF component comprises a soot oxidation rate based on an $NO_2$ flow rate into the DPF.

10. The apparatus of claim 8, wherein the at least one conditioning component further comprises a diesel particulate filter (DPF) in the first flowpath.

11. The apparatus of claim 1:
   further comprising a mixing component configured to combine the flow from the first flowpath with the flow from the second flowpath;
   wherein the DOC is configured to convert a portion of nitric oxide (NO) flowing through the DOC to nitrogen dioxide ($NO_2$);

wherein the second flowpath comprises a fluid conduit configured to deliver the second fraction to the mixing component;

wherein the at least one target component comprises a diesel particulate filter (DPF) configured to receive the combined flow from the mixing component;

wherein the DOC outlet $NO_2/NO_x$ mole ratio is based on a flow rate through the DOC;

wherein the at least one operating condition comprises a mass flow rate of the fluid stream, a NOx concentration of the fluid stream, a temperature of the DOC, and a temperature of the DPF;

wherein the operating criteria for the DPF component comprises a soot oxidation rate based on an $NO_2$ flow rate into the DPF.

12. The apparatus of claim 11, wherein the controller further comprises an emissions module configured to determine a minimum first fraction value based on an emissions compliance scheme; and wherein the fraction determination module is further configured to determine the first fraction target based on the minimum first fraction value.

13. The apparatus of claim 11:
wherein the at least one conditioning component further comprises a second DOC in the second flowpath configured to convert a portion of nitric oxide (NO) flowing through the second DOC to nitrogen dioxide ($NO_2$);

wherein the at least one operating condition further comprises temperature of the second DOC; and wherein the performance criteria further comprises a second DOC outlet $NO_2/NO_x$ mole ratio based on a flow rate through the second DOC.

14. A non-transitory computer program product comprising a computer readable medium having computer usable program code programmed to enhance the efficiency of an exhaust aftertreatment system, the program product having operations comprising:

interpreting a plurality of operating conditions comprising a fluid stream flow rate, a $NO_x$ fraction in the fluid stream, an $NO_2/NO_x$ mole ratio in the fluid stream, and a temperature of a diesel oxidation catalyst (DOC) in a first flowpath;

interpreting operating criteria for each of at least one target component, the at least one target component comprising a selective catalytic reduction (SCR) component and the operating criteria comprising a desired $NO_x$ to $NO_2$ reduction efficiency of the SCR component;

interpreting performance criteria for each of at least one conditioning component comprising the DOC, the performance criteria comprising an $NO_2/NO_x$ mole ratio out of the DOC based on a flow rate through the DOC;

determining a first fraction target based on the plurality of operating conditions, the operating criteria, and the performance criteria, wherein the first fraction target corresponds to a desired $NO_2$ concentration in the fluid stream at an inlet of the SCR component to achieve the desired $NO_x$ to $NO_2$ reduction efficiency; and manipulating a bypass valve position based on the first fraction target to achieve the desired $NO_2$ concentration in the fluid stream at the inlet of the SCR component, the bypass valve configured to direct a first fraction of the fluid stream to the first flowpath to pass through the DOC, wherein the first fraction comprises an amount between zero and one hundred percent inclusive of the fluid stream, the bypass valve further configured to direct a second fraction of the fluid stream to a second flowpath to bypass the DOC.

15. The computer program product of claim 14, wherein the DOC is positioned within the first flowpath and the bypass valve position is manipulated such that a $NO_2$ concentration in the first fraction of the fluid stream at an outlet of the first flowpath plus a $NO_2$ concentration in the second fraction of the fluid stream at an outlet of the second flowpath equals the desired $NO_2$ concentration.

16. The computer program product of claim 15, wherein the at least one conditioning component further comprises a diesel particulate filter (DPF) in the first flowpath, the operations further comprising: interpreting an emissions compliance scheme comprising a maximum particulate level, determining a minimum first fraction value based on the emissions compliance scheme, and wherein determining the first fraction target further comprises determining the first fraction target based on the minimum first fraction value.

17. The computer program product of claim 15, wherein interpreting a plurality of operating conditions further comprises determining a temperature of a second DOC in the second flowpath, and wherein interpreting performance criteria for each of the at lest one conditioning component further comprises determining an $NO_2/NO_x$ mole ratio out of the second DOC based on a flow rate through the second DOC.

18. The computer program product of claim 14, wherein the at least one target component further comprises a diesel particulate filter (DPF), wherein interpreting operating criteria for each of the at least one target component further comprises determining a soot oxidation rate based on an $NO_2$ flow rate into the DPF.

19. A system for enhancing the efficiency of an exhaust aftertreatment application, the system comprising:

an internal combustion engine producing an exhaust stream;

a bypass valve configured to direct a first fraction of the fluid stream to a conditioning component comprising a diesel oxidation catalyst (DOC), wherein the first fraction comprises an amount between zero and one hundred percent inclusive of the fluid stream;

the bypass valve further configured to direct a second fraction of the fluid stream to a fluid conduit to bypass the DOC;

a mixing component configured to combine the flow from the DOC and the fluid conduit;

a reagent injector configured to add a reducing reagent to the flow from the mixing component;

a target component comprising a selective catalytic reduction (SCR) component configured to reduce $NO_x$ to $N_2$ within the flow from the mixing component;

a controller comprising:
a sensing module configured to interpreting a plurality of operating conditions comprising a fluid stream flow rate, a $NO_x$ fraction in the fluid stream, an $NO_2/NO_x$ mole ratio in the fluid stream, and a temperature the DOC;

a target selection module configured to interpret operating criteria comprising a $NO_x$ to $N_2$ conversion based on an $NO_2/NO_x$ mole ratio into the SCR component;

a conditioning performance module configured to interpret performance criteria for the DOC, the performance criteria comprising an $NO_2/NO_x$ mole ratio out of the DOC based on a flow rate through the DOC;

a fraction determination module configured to determine a first fraction target based on the plurality of operating conditions, the operating criteria and the performance criteria; and a valve position module configured to manipulate the bypass valve position based on the first fraction target to manipulate the $NO_2/NO_x$ mole ratio out of the DOC to achieve a desired $NO_2$ concentration in the fluid stream entering the SCR component.

20. A method for modifying an aftertreatment system comprising:

installing a bypass valve and a second flowpath on an exhaust aftertreatment system, the bypass valve configured to allow a first fraction of an exhaust stream to flow through a diesel oxidation catalyst (DOC), and to allow a second fraction of the exhaust stream to flow through the second flowpath around the DOC, the first fraction comprising an amount between zero and one hundred percent inclusive of the exhaust stream;

installing a controller configured to perform operations comprising:

interpreting a plurality of operating conditions comprising a fluid stream flow rate, a $NO_x$ fraction in the fluid stream, an $NO_2/NO_x$ mole ratio in the fluid stream, and a temperature the DOC;

interpreting operating criteria for a target component comprising a selective catalytic reduction (SCR) component;

interpreting performance criteria for the DOC, the performance criteria comprising an $NO_2/NO_x$ mole ratio out of the DOC based on a flow rate through the DOC;

determining a first fraction target based on the plurality of operating conditions, the operating criteria and the performance criteria, the first fraction target corresponding to a desired $NO_2$ concentration at an inlet of the SCR component; and manipulating the bypass valve position based on the first fraction target such that a $NO_2$ concentration of the exhaust stream exiting the DOC and a $NO_2$ concentration of the exhaust stream exiting the second flowpath is approximately equal to the desired $NO_2$ concentration at the inlet of the SCR component.

21. The method of claim 20, wherein the operating criteria comprises a $NO_x$ to $N_2$ conversion based on an $NO_2/NO_x$ mole ratio into the SCR component.

* * * * *